United States Patent
Eguchi et al.

(10) Patent No.: US 7,246,520 B2
(45) Date of Patent: Jul. 24, 2007

(54) TRANSDUCER, ELECTRONIC EQUIPMENT, AND METHOD OF ADJUSTING FREQUENCY OF TRANSDUCER

(75) Inventors: Makoto Eguchi, Suwa (JP); Shigeo Kanna, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 10/928,103

(22) Filed: Aug. 30, 2004

(65) Prior Publication Data
US 2005/0086995 A1 Apr. 28, 2005

(30) Foreign Application Priority Data
Sep. 1, 2003 (JP) .............................. 2003-308693
Jun. 22, 2004 (JP) .............................. 2004-183654

(51) Int. Cl.
*G01P 9/04* (2006.01)
(52) U.S. Cl. .................................. 73/504.16; 73/504.15
(58) Field of Classification Search ............. 73/504.15, 73/504.16, 504.12
See application file for complete search history.

(56) References Cited

U.S. PATENT DOCUMENTS

| | | | |
|---|---|---|---|
| 5,166,571 A | 11/1992 | Konno et al. | |
| 5,635,642 A | 6/1997 | Nonomura et al. | |
| 5,763,781 A * | 6/1998 | Netzer | 73/504.16 |
| 5,889,208 A * | 3/1999 | Nose | 73/504.16 |
| 6,065,339 A * | 5/2000 | Takeuchi et al. | 73/504.12 |
| 6,119,518 A | 9/2000 | Itou et al. | |

FOREIGN PATENT DOCUMENTS

| | | |
|---|---|---|
| EP | 0 829 703 A | 3/1998 |
| JP | B2 07-69180 | 7/1995 |
| JP | 10-170272 | 6/1998 |
| JP | A 10-160479 | 6/1998 |

* cited by examiner

*Primary Examiner*—John E. Chapman
(74) *Attorney, Agent, or Firm*—Oliff & Berridge, PLC

(57) ABSTRACT

To provide a transducer that can detect the rotation of the transducer with high degree of accuracy, a transducer includes a pair of oscillating reeds extending in the Y-direction to generate a first oscillation to generate a Coriolis force corresponding to the rotation of the transducer, a beam extending in the X-direction and connected to the pair of oscillating reeds, a first detecting unit provided on the beam to detect deformation of the beam due to a second oscillation of the pair of oscillating reeds caused by the Coriolis force, a base member to support the beam, a first connecting device to connect one end of the beam and the base member, and a second connecting device to connect the other end of the beam and the base member.

11 Claims, 16 Drawing Sheets

TRANSDUCER, ELECTRONIC EQUIPMENT, AND METHOD OF ADJUSTING FREQUENCY OF TRANSDUCER

BACKGROUND OF THE INVENTION

1. Field of Invention

Exemplary aspects of the present invention relate to a transducer, such as a gyroscope, electronic equipment provided with the transducer, and a method of adjusting the frequency of the transducer.

2. Description of Related Art

Japanese Examined Patent Application Publication No. 7-69180 discloses a transducer including a base portion connected to an arm member to generate oscillation corresponding to the rotation of the transducer. The base portion is fixed to a base member via a supporting member provided to project from the center of the base portion therefrom. The supporting member detects torsional oscillation, to detect the rotation of the transducer.

Japanese Unexamined Patent Application Publication No. 10-160479 discloses a method of adjusting frequency of a transducer by changing the mass of the respective oscillating strips by adding a mass to the distal end of one of an oscillating strip for excitation and an oscillating strip for detection or by removing the added mass. Thus, the frequency of the exciting oscillation and the frequency of the detected oscillation.

SUMMARY OF THE INVENTION

However, in the transducers described above, there is a problem that oscillation of the arm member may concentrate at the single supporting member provided at the center of the base portion and hence leak to the base member. This caused impaired oscillation. As a result, accurate detection of the rotation of the transducer is difficult.

Also, torsional oscillation cannot be detected with a high degree of accuracy since the angular speed is detected by the supporting member located apart from the oscillating strip.

Furthermore, according to the method of adjusting frequency in the related art, even when an attempt was made to adjust the difference between the frequency of the driving oscillation and the frequency of the detected frequency within a predetermined range, there might be a case in which the frequency could not be sufficiently adjusted. This results in lowered process yield because the adjusting range is small. In addition, the frequency of the driving oscillation and the frequency of the detected oscillation may be subject to affects with respect to each other.

In order to address the above and/or other problems, exemplary aspects of the present invention provide a transducer in which the rotation of the transducer can be detected with a high degree of accuracy, and provide electronic equipment having a transducer in which the rotation of the transducer can be detected with a high degree of accuracy.

Exemplary aspects of the present invention also provide a method of adjusting the frequency of the transducer to facilitate adjustment of the frequency and enhancing the process yield.

A transducer according to an exemplary aspect of the present invention includes a rod-shaped oscillating reed extending along a first direction (Y-direction), which corresponds to a center axis of rotation of the transducer, to generate a first oscillation to generate a Coriolis force corresponding to the rotation, a beam extending to a second direction (X-direction) in parallel with a virtual plane (XY plane) including the oscillating reed and perpendicular to the first direction (Y-direction) and connected to the oscillating reed, a first detecting unit provided on the beam to detect deformation of the beam due to a second oscillation of the oscillating reed caused by the Coriolis force, a base member to support the beam, a first connecting device for connecting one end of the beam and the base member, and a second connecting device to connect the other end of the beam and the base member.

According to the transducer of an exemplary aspect of the present invention, since the beam connected to the oscillating reed is connected at one end to the base member by the first connecting device and is connected at the other end to the base member by the second connecting device, leakage of the second oscillation due to the Coriolis force can be reduced in comparison with the transducers in the related art. Accordingly, deformation of the beam generated by the second oscillation increases in comparison with the transducer in the related art, whereby the rotation of the transducer can be detected with high degree of accuracy.

In order to address the problems described above, a transducer according to an exemplary aspect of the present invention includes a pair of rod-shaped oscillating reeds extending along a first direction (Y-direction), which corresponds to a center axis of rotation of the transducer, to generate a first oscillation to generate a Coriolis force corresponding to the rotation, a beam extending to a second direction (X-direction) in parallel with a virtual plane (XY plane) including the pair of oscillating reeds and perpendicular to the first direction (Y-direction) and connected to the pair of oscillating reeds, a first detecting unit provided on the beam to detect deformation of the beam due to a second oscillation of the pair of oscillating reeds caused by the Coriolis force, a base member to support the beam, a first connecting device to connect one end of the beam and the base member, and a second connecting device to connect the other end of the beam and the base member.

In the transducer according to an exemplary aspect of the present invention the oscillating reed includes a pair of rod-shaped oscillating reeds extending along the first direction, which corresponds to the center axis of the rotation of the transducer in parallel to each other.

According to the transducer of an exemplary aspect of the present invention, since the beam connected to the pair of oscillating reeds is connected at one end thereof to the base member by the first connecting device and is connected at the other end thereof to the second connecting device, leakage of the second oscillation generated by the Coriolis force to the base member can be reduced with respect to the transducers in the related art. Accordingly, deformation of the beam generated by the second oscillation is increased in comparison with the transducer in the related art. Hence the rotation of the transducer can be detected with high degree of accuracy.

In the transducer according to an exemplary aspect of the present invention, the beam may be connected at one end to one of the pair of oscillating reeds, and is connected at the other end to the other one of the pair of the oscillating reeds.

In the transducer according to an exemplary aspect of the present invention, the first connecting device may connect the point of connection between one end of the beam and one of the oscillating reeds and the base member, and the second connecting device may connect the point of connection between the other end of the beam and the other one of the oscillating reeds and the base member.

In the transducer according to an exemplary aspect of the present invention, one end and the other end of the beam may be located at a position other than the portion between the pair of oscillating reeds.

In the transducer according to an exemplary aspect of the present invention, the first detecting unit may be provided between the pair of oscillating reeds.

The transducer according to an exemplary aspect of the present invention may include a third connecting device to connect the portion of the beam substantially at the center thereof and the base member, and a second detecting unit provided on the beam to detect deformation of the beam, and the first detecting unit and the second detecting unit cooperate to perform detection to eliminate a disturbance for the rotation of the transducer in a third direction (Z-direction) perpendicular to the virtual plane (XY plane).

In the transducer according to an exemplary aspect of the present invention, the first detecting unit may be provided between one of the pair of oscillating reeds and the third connecting device, and the second detecting unit may be provided between the other one of the pair of oscillating reeds and the third connecting device.

In the transducer according to an exemplary aspect the present invention, the first detecting unit may be provided between one of the pair of oscillating reeds and the third connecting device, and the second detecting unit may be provided between one oscillating reed and either the one end or the other end of the beam, which is closer to the one oscillating reed.

In the transducer according to an exemplary aspect of the present invention, the distance between one of the pair of oscillating reeds and the third connecting device may be shorter than the distance between the one oscillating reed and one of the first connecting device and the second connecting device, which is closer to the one oscillating reed.

In the transducer according to an exemplary aspect of the present invention, the first detecting unit may be provided between the one end of the beam, which is located at the point other than the portion between the pair of oscillating reeds and one of the pair of oscillating reeds, which is closer to the one end of the beam.

The transducer according to an exemplary aspect of the present invention may include a second detecting unit provided between the other end of the beam and the other one of the pair of oscillating reeds located at the point other than the portion between the pair of oscillating reeds to detect deformation of the beam, and the first detecting unit and the second detecting unit cooperate to perform detection to eliminate a disturbance for the rotation of the transducer in a third direction (Z-direction) perpendicular to the virtual plane (XY plane).

In the transducer according to an exemplary aspect of the present invention, the pair of oscillating reeds, the beam, the first connecting device, the second connecting device, and the base member are formed of crystal.

Electronic equipment according to exemplary aspects of the present invention include the transducer according to exemplary aspects of the present invention.

Exemplary aspects of the present invention provide a method of adjusting frequency of the transducer. The transducer includes a rod-shaped oscillating reed extending along a first direction, which corresponds to the center axis of rotation of the transducer, to generate a first oscillation to generate a Coriolis force corresponding to the rotation, a beam extending in a second direction parallel with a virtual plane including the oscillating reed and perpendicular to the first direction, a base member to support the beam, a first connecting device to connect one end of the beam and the base member, and a second connecting device to connect the other end of the beam and the base member. The frequency of the transducer is adjusted by adjusting a mass on at least one of the ends of the oscillating reed.

In this arrangement, the frequency of the driving oscillation of the oscillating reed can be adjusted by adjusting the mass at the end of the oscillating reed, and the difference between the frequency of the driving oscillation and the frequency of the detected oscillation can be adjusted by adjusting the mass to the other end of the oscillating reed.

A method of adjusting the frequency of the transducer according to an exemplary aspect of the present invention includes adjusting the frequency of the driving oscillation and the frequency of the detected oscillation by adjusting the mass at the distal end of a first extending portion extending longitudinally from the beam of the oscillating reed. The difference between the frequency of the driving oscillation and the frequency of the detected oscillation is adjusted by adjusting the mass at the distal end of a second extending portion extending from the beam of the oscillating reed.

In this arrangement, it is possible to adjust the frequency of the driving oscillation and the frequency of the detected oscillation by the first extending portion, and to adjust the difference of the frequency of the driving oscillation and the frequency of the detected oscillation by the second extending portion. Accordingly, a transducer with enhanced performance is provided.

Also, a method of adjusting the frequency of a transducer according to an exemplary aspect of the present invention is characterized in that the distal end of the second extending portion is provided with a frequency adjusting device formed larger than the proximal end thereof. The frequency of the transducer is adjusted by adjusting the mass of the frequency adjusting device.

In this manner, since the distal end of the second extending portion is formed larger than the proximal end thereof, the amount of adjustment of the mass can be increased, and the adjustable range of the frequency can be increased correspondingly. Therefore, failure of adjusting the frequency can be avoided and hence the process yield of the transducer can be improved.

DETAILED DESCRIPTION OF EXEMPLARY EMBODIMENTS

Figure 1A:
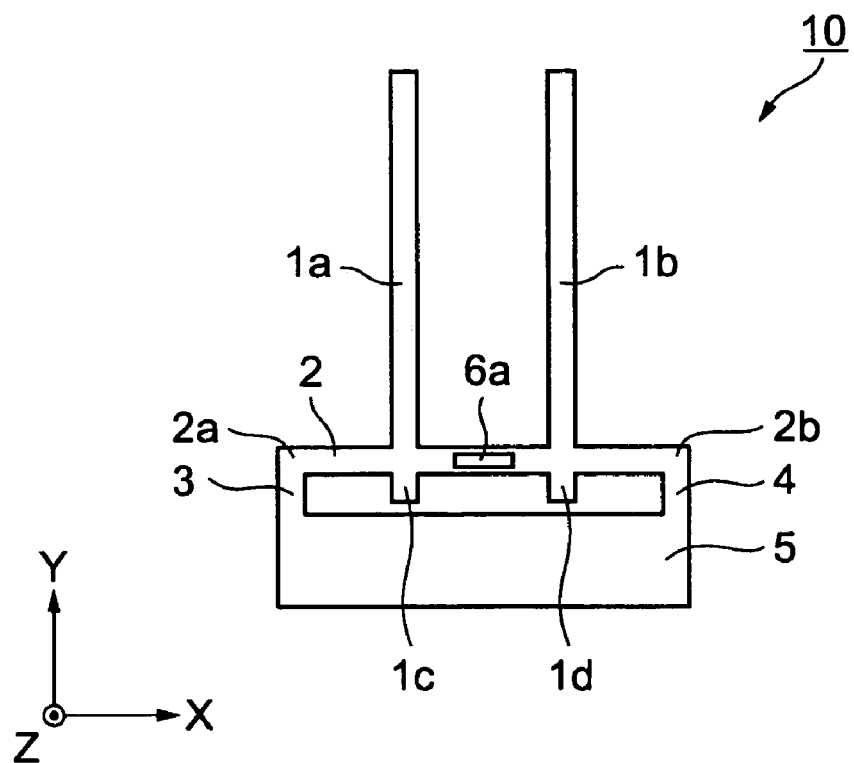
FIGS. 1A and 1B show the structure of a transducer according to a first exemplary embodiment.

Referring to the drawings, exemplary embodiments of a transducer according to the present invention will be described.

Exemplary Embodiment 1

Figure 1B:
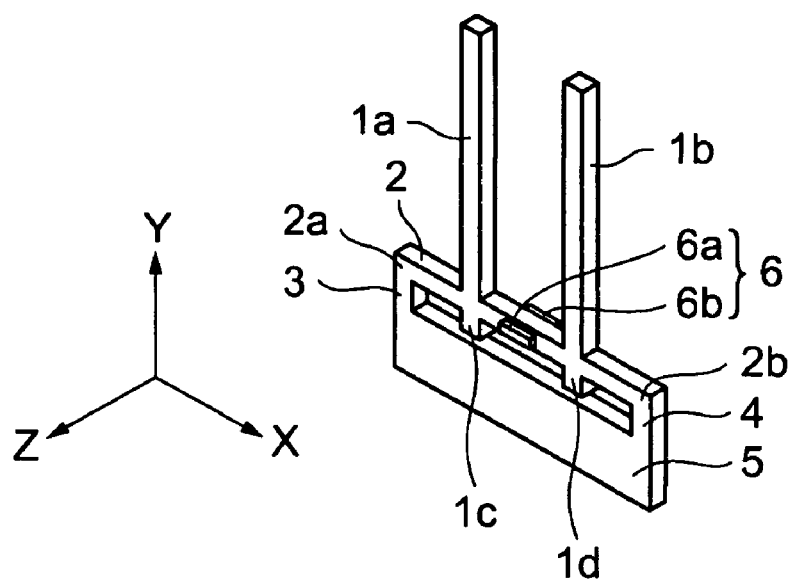

FIG. 1A and FIG. 1B are schematics showing a structure of a transducer according to a first exemplary embodiment. A transducer 10 according to the first exemplary embodiment generates oscillation to generate a Coriolis force corresponding to the rotation about the Y-axis (hereinafter "driving oscillation") and oscillation to detect the rotation caused by the Coriolis force (hereinafter "detecting oscillation"). The transducer 10 generates the driving oscillation when in drive mode and generates the detecting oscillation in detecting mode. In order to generate oscillation in both modes described above, the transducer 10 includes a pair of oscillating reeds 1a, 1b, a beam 2, a first connecting device (connecting member) 3, a second connecting device (connecting member) 4, a base member 5, and a detecting unit 6.

The pair of oscillating reeds 1a, 1b are rod-shaped members formed of crystal extending along the Y-axis in parallel to each other and having a predetermined length.

The beam 2 is a rod-shaped member formed of crystal extending in parallel with a virtual plane (XY plane) including the pair of oscillating reads 1a, 1b and extending in the X-axis direction which is perpendicular to the Y-axis and having a predetermined length. The beam 2 intersects with the pair of oscillating reeds 1a, 1b. Accordingly, one end 2a and the other end 2b of the beam 2 are positioned at a point other than the portion between the pair of oscillating reeds 1a, 1b, and the lower end 1c of one oscillating reed 1a and the lower end 1d of the other oscillating reed 1b project downwardly of the beam 2.

A first connecting device 3 and a second connecting device 4 are rod-shaped members formed of crystal and extend along the Y-axis direction and have a predetermined length. The first connecting device 3 connects an end 2a of the beam 2 and the base member 5, the second connecting device 4 connects the other end 2b of the beam 2 and the base member 5.

The base member 5 is a member formed of crystal having a laterally elongated rectangular parallelepiped shape to support the beam 2 which retains the oscillating reeds 1a, 1b via the first connecting device 3 and the second connecting device 4.

A detecting unit 6 includes detecting electrodes 6a, 6b provided at a portion substantially centered of two surfaces (the front surface and the back surface) extending in parallel with the virtual plane (XY plane) of the beam 2, and detects deformation of the beam 2 generated by oscillations for detection of the pair of oscillating reeds 1a, 1b according to the related art principle of piezoelectricity, when in the aforementioned detecting mode.

The pair of oscillating reeds 1a, 1b include driving elements, not shown, for exciting driving oscillation.

Figure 15A:
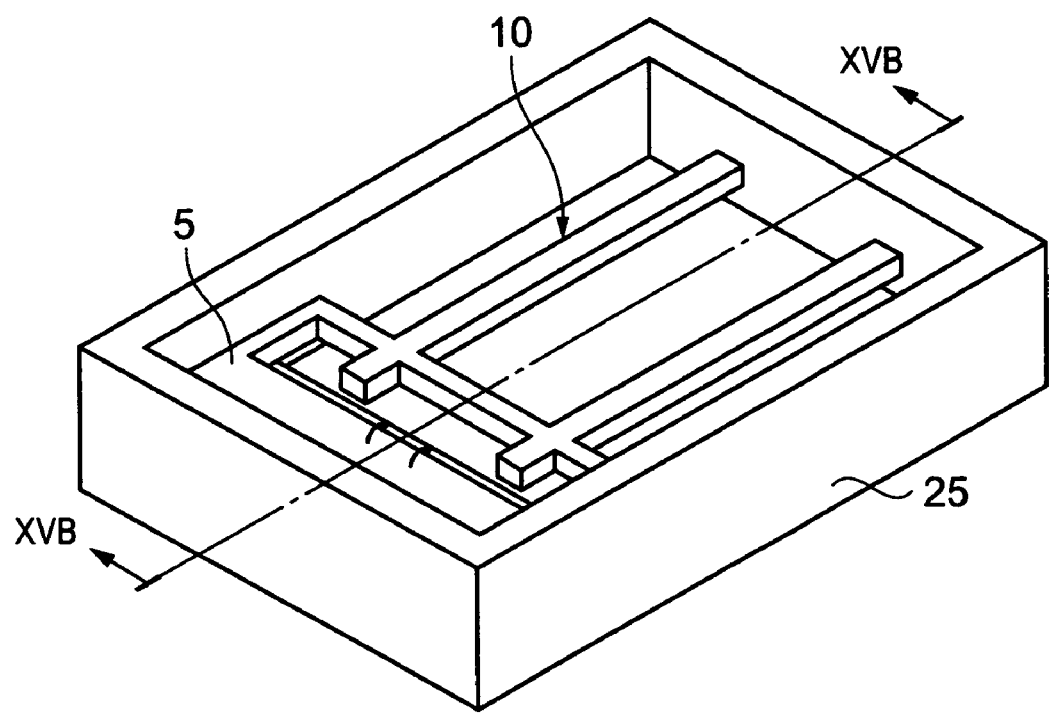
FIGS. 15A and 15B show the structure of the packaged transducer according to the first exemplary embodiment.
Figure 15B:
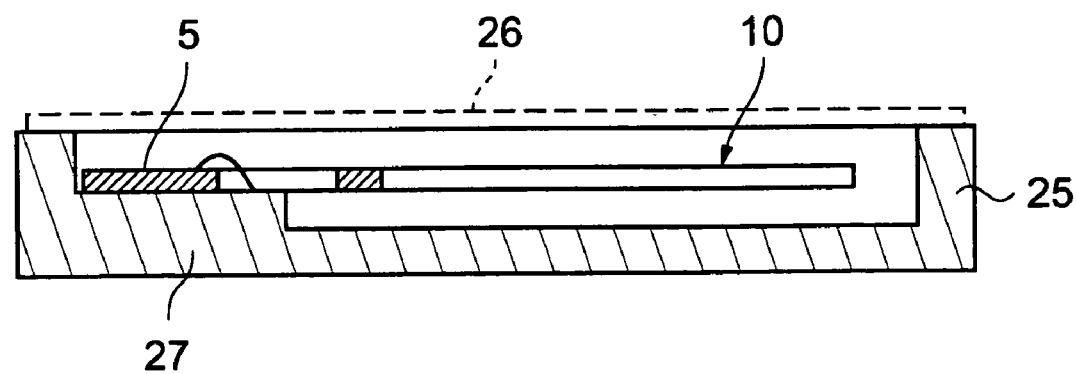

FIG. 15A is a schematic showing a state in which the transducer 10 is stored in a storage container, and FIG. 15B is a schematic taken along the plane XVB-XVB in FIG. 15A.

A storage container 25 formed of ceramics, for example, is opened on one surface and is formed with a recess. The transducer 10 is secured to the storage container 25 by bonding the base member 5 of the transducer 10 and a placing section 25 of the storage container 25 to the recess. Although it is not shown in the drawings, electrical connection is established by connecting wiring formed on the transducer and wiring formed on the storage container 25 by wire bonding process. The upper surface of the storage container 25 is sealed by a lid 26 in a state in which the interior is maintained in vacuum atmosphere or inert gas atmosphere to form a packaged transducer.

In the aforementioned wiring connection, it is also possible to connect with a conductive adhesive agent, and not by the wire bonding procedure.

It is also possible not to provide the base member of the transducer 10 and to allow the placing section 27 of the storage container 25 to serve as a base member of the transducer 10 by extending the first connecting device 3 and the second connecting device 4 and bonding the respective terminal portions to the placing section 27 of the storage container 25.

Figure 2A:
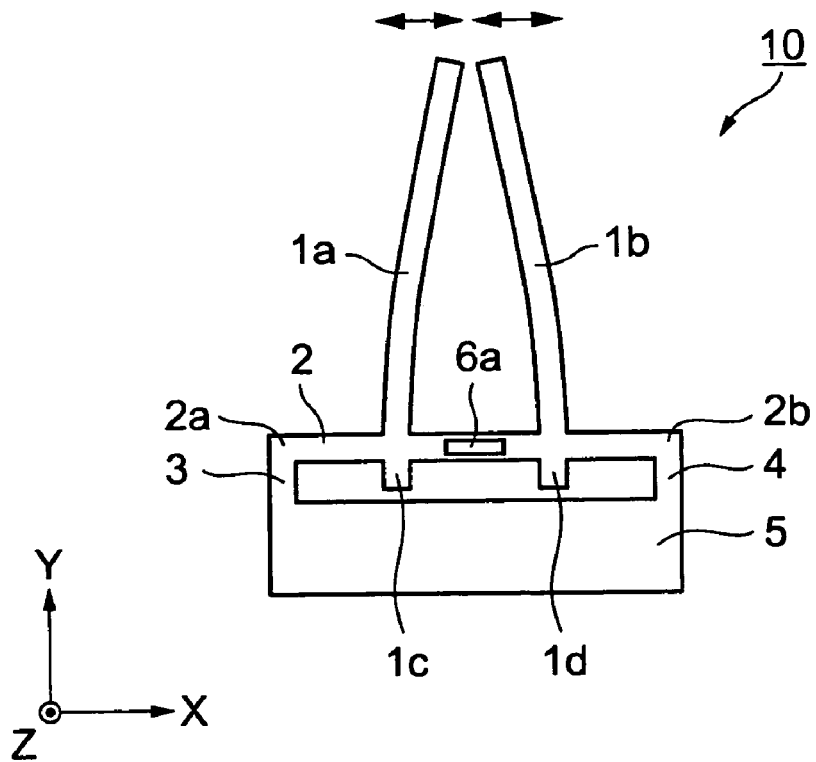
FIGS. 2A and 2B show a driving mode of the transducer according to the first exemplary embodiment.
Figure 2B:
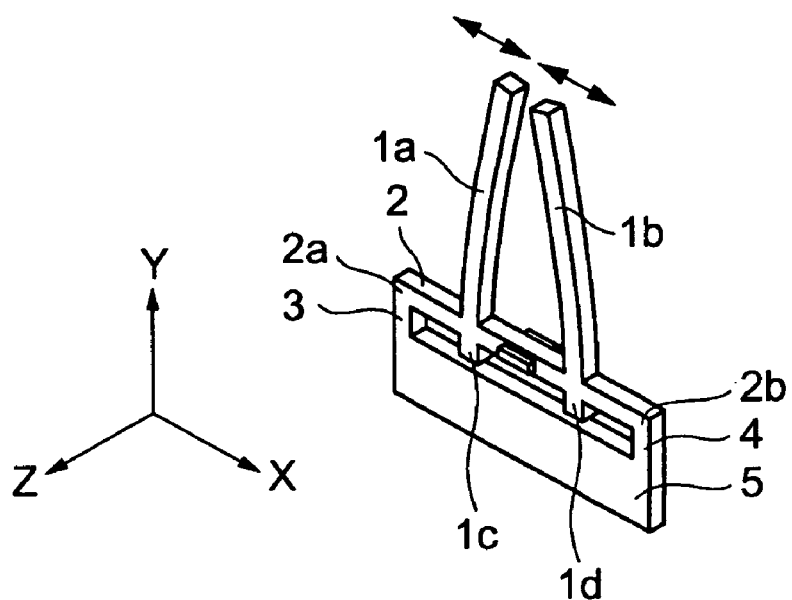

FIG. 2A and FIG. 2B are schematics showing the drive mode of the transducer according to the first embodiment, respectively. In the drive mode, the pair of oscillating reeds 1a, 1b generate bending oscillation in a negative-phase relation with respect to each other along the X-axis direction as shown in FIGS. 2A and B by the assistance of the aforementioned drive element. Specifically, as shown in FIGS. 2A and B, when the oscillating strip 1a is deformed into the "(" shape with respect to the X-axis, the oscillating reed 1b is deformed into the ")" shape and, in contrast to the illustration in FIGS. 2A and B, when the oscillating reed 1a is deformed into the ")" shape, the oscillating reed 1b is deformed into the "(" shape. The oscillating reeds 1a, 1b oscillate such that the distal ends thereof move toward and away from each other.

While the lower end 1c of the oscillating reed 1a and the lower end 1d of the oscillating reed 1b oscillate in association with the oscillation of the oscillating reeds 1a, 1b, such oscillation hardly affects the oscillation of the oscillating reeds 1a, 1b.

Figure 3A:
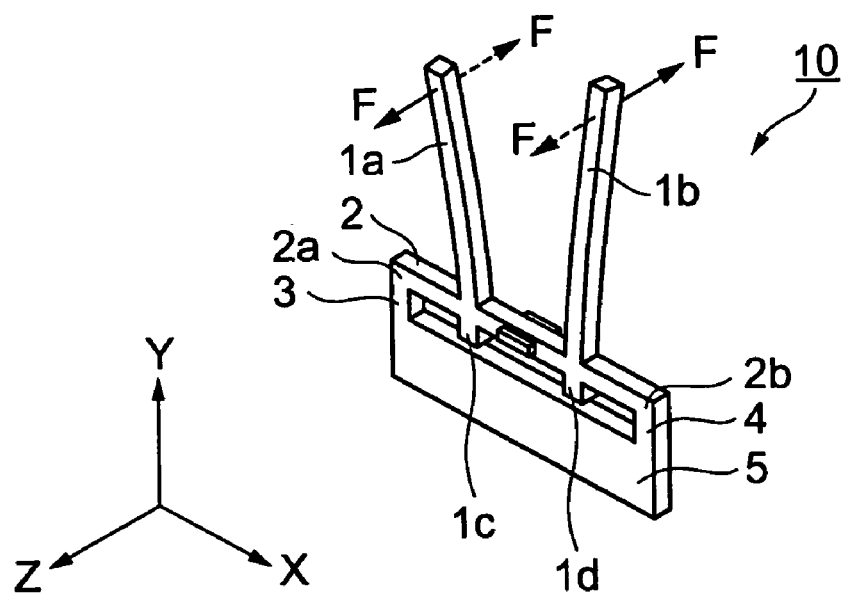
FIGS. 3A and 3B show a detecting mode of the transducer according to the first exemplary embodiment.
Figure 3B:
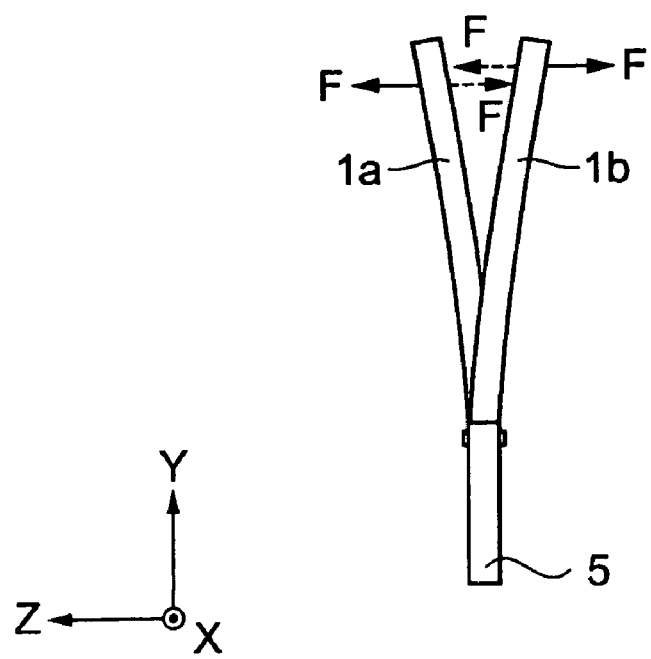

FIG. 3A and FIG. 3B are schematics showing the detecting mode of the transducer according to the first exemplary embodiment, respectively. When the transducer 10 rotates about the Y-axis in the detecting mode, in other words, in the case where the pair of oscillating reeds 1a, 1b generate driving oscillation in the drive mode, a Coriolis force F shown by a solid arrow in the drawing and a Coriolis force F shown by a dotted line are generated alternately on the pair of oscillating reeds 1a, 1b. The pair of oscillating reeds 1a, 1b generate bending oscillation along the Z-axis direction perpendicular to the aforementioned virtual plane (XY plane) in a negative-phase relation with respect to each other. Specifically, as shown in FIGS. 3A and B, when the oscillation reed 1a is deformed into the ")" shape, the oscillating reed 1b is deformed into the "(" shape and, in contrast to the illustration in FIGS. 3A and B, when the oscillating reed 1a is deformed into the "(" shape with respect to the Z-axis, the oscillating reed 1b is deformed into the ")" shape.

The lower end 1c of the oscillating reed 1a and the lower end 1d of the oscillating reed 1b oscillate slightly in association with the oscillation of the aforementioned oscillating reeds 1a, 1b, and the oscillation is generated in the negative-phase so as to balance with the oscillation of the respective oscillating reeds 1a, 1b.

When the pair of oscillating reeds 1a, 1b generate the aforementioned detecting oscillation along the Z-axis direction, the beam 2 is deformed by the detecting oscillation, and, in particular, the center portion of the beam 2 is deformed to a larger extent than other portions, such as portions near the both ends 2a, 2b of the beam 2. Consequently, the detecting unit 6 provided substantially at the center portion of the beam 2 detects deformation of the beam 2, and outputs a signal indicating such deformation to a calculating circuit (not shown). The calculation circuit calculates the rotation of the transducer 10 about the Y-axis, for example, the amount, the speed, the acceleration, and the direction of the rotation by calculating the signal according to a related art method.

As described above, according to the transducer 10 of the first exemplary embodiment, since the beam 2 to retain the pair of oscillating reeds 1a, 1b is coupled to the base member 5 by connecting one end 2a to the base member 5 via the first connecting device 3, and the other end 2b to the base member 5 via the second connecting device 4, diffusion of the detecting oscillation generated by the Coriolis force F to the base member 5, that is, leakage thereof, may be reduced or prevented. Accordingly, the detecting oscillation of the pair of oscillating reeds 1a, 1b can be propagated more efficiently than the transducer in the related art, and hence deformation of the beam 2 caused by the detecting oscillation increases in comparison with the related art, whereby the detecting unit 6 can detect the rotation of the transducer 10 with higher degree of accuracy than in the related art.

In addition, according to the transducer 10 in the first exemplary embodiment, since the pair of oscillating reeds 1a, 1b are formed of crystal, the frequencies of the driving oscillation and the detecting oscillation generated by the pair of oscillating reeds a, 1b can be stabilized.

Figure 4:
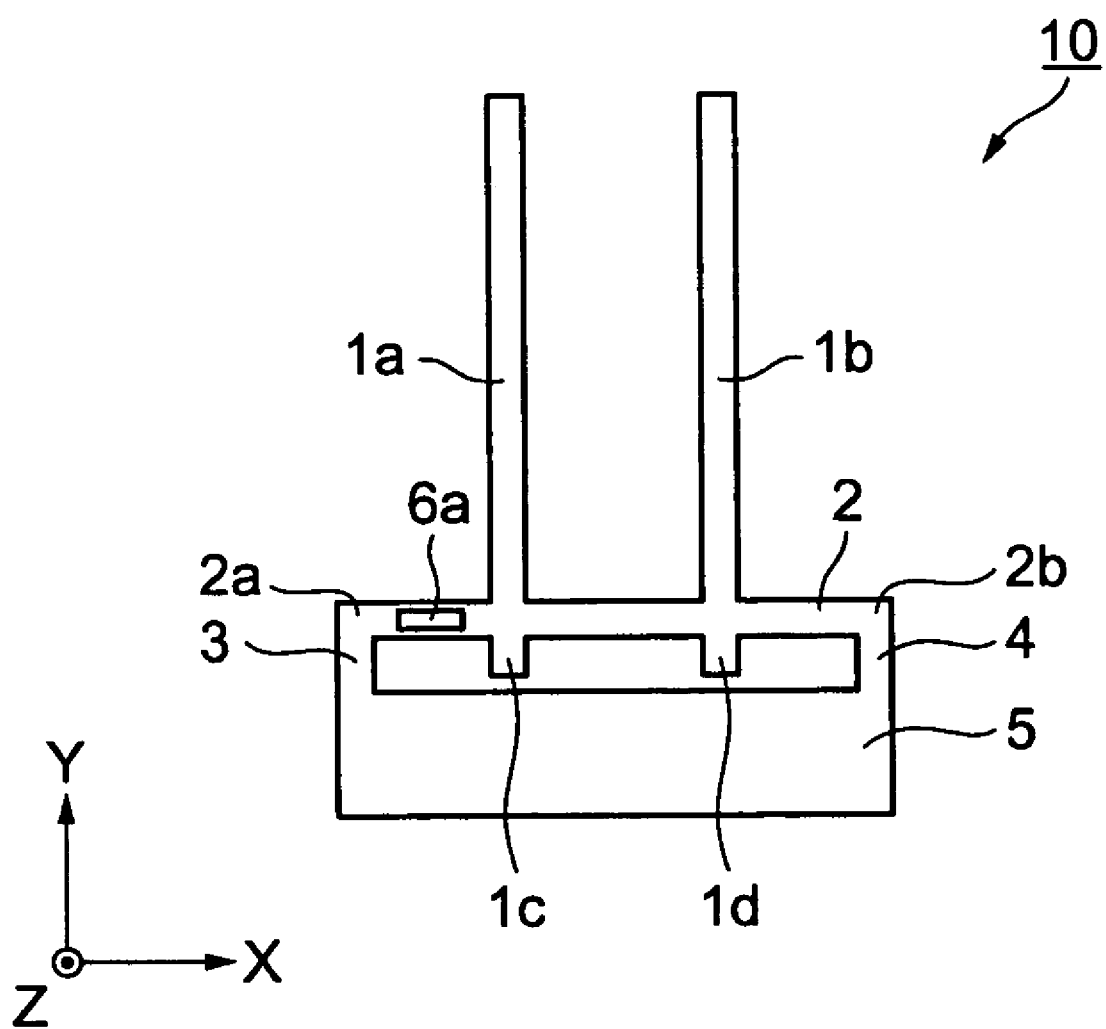
FIG. 4 shows another position of a detecting unit according to the first exemplary embodiment.

By providing the detecting unit 6, specifically, the detecting electrodes 6a, 6b, at the portion other than the portion between the pair of oscillating reeds 1a, 1b of the beam 2, more specifically, between one end 2a of the beam 2 and one oscillating reed 1a, as shown in FIG. 4, instead of providing the detecting unit substantially at the center of the beam 2 as described above, the rotation of the transducer 10 can be detected at least with higher degree of accuracy in comparison with the related art. Although it is not as accurate as the case in which the detecting unit 6 is provided substantially at the center of the beam 2.

The first connecting device 3 and the second connecting device 4 achieve similar effects as those described above by being provided along the Y-axis direction as described above, that is, by being provided in asymmetrical relation with respect to detecting unit 6, instead of being provided in symmetrical relation.

The lower ends 1c, 1d of the pair of oscillating reeds 1a, 1b can achieve similar effects as those described above by being provided so as not to project downwardly of the beam 2 instead of being provided so as to project downwardly of the beam 2 as described above. Although inertia of the oscillation of the pair of oscillating reeds 1a, 1b is slightly deteriorated.

Although the material of the transducer may be crystal, which is a piezoelectric material, in the above described exemplary embodiment, it is also possible to employ constant modulus material, such as Elinver material, or piezoelectric material, such as lithium tantalate ($LiTaO_3$), lithium niobate ($LiNbO_3$), and gallium phosphate ($GaPO_4$).

Second Exemplary Embodiment

Figure 5A:
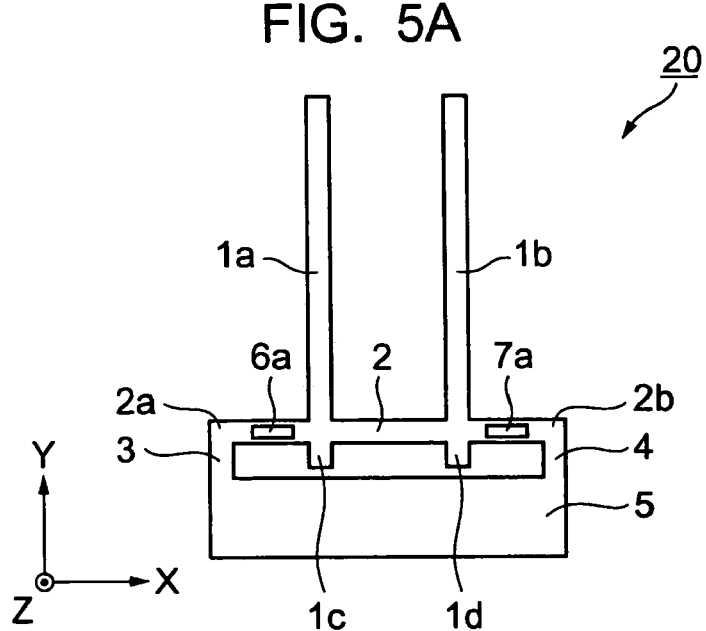
FIGS. 5A-5C show the structure of a transducer according to a second exemplary embodiment.
Figure 5B:
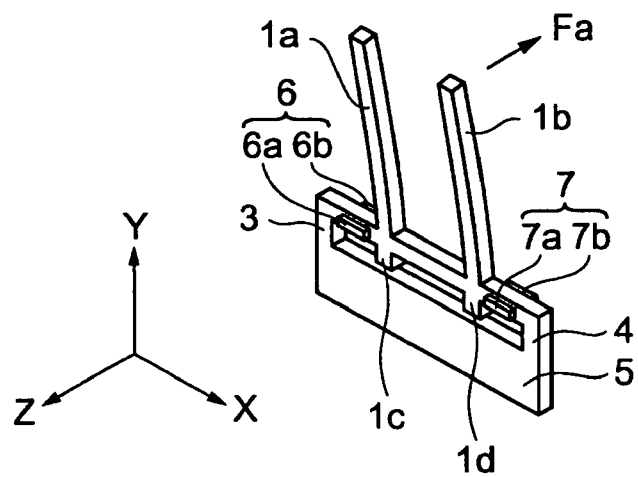
Figure 5C:
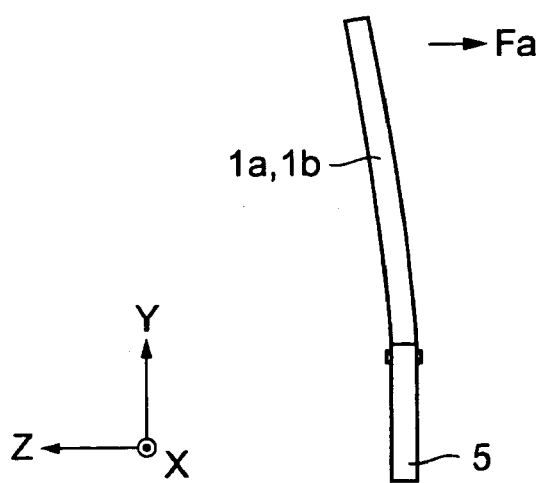

FIG. 5A, FIG. 5B, and FIG. 5C are schematics showing the structure of a transducer according to the second exemplary embodiment. A transducer 20 according to the second embodiment includes the pair of oscillating reeds 1a, 1b, the beam 2, the first connecting device 3, the second connecting device 4, the base member 5, and the detecting unit 6, as in the transducer 10 of the first exemplary embodiment, and a detecting unit 7, which is provided at a different point from the transducer 10 of the first exemplary embodiment. The detecting unit 7 includes detecting electrodes 7a, 7b having the same structure as the detecting electrodes 6a, 6b of the transducer 10 in the first exemplary embodiment.

The detecting units 6, 7 are provided at the point other than the portion between the pair of oscillating reeds 1a, 1b of the beam 2, and, specifically, the detecting unit 6 is provided between one end 2a of the beam 2 and the one oscillating reed 1a, and the detecting unit 7 is provided between the other end 2b of the beam 2 and the other oscillating reed 1b.

In the transducer 20 of the second exemplary embodiment, the respective detecting units 6 and 7 can detect the rotation of the transducer 20 about the Y-axis by driving oscillation shown in FIG. 2 and detecting oscillation, shown in FIG. 3, by the pair of oscillating reeds 1a, 1b with a higher degree of accuracy in comparison with the related art as in the case of the detecting unit 6 of the transducer 10 in the first exemplary embodiment. In addition to the detection of the rotation, according to the transducer 20 in the second exemplary embodiment, when an acceleration Fa along the Z-axis direction, which functions as a disturbance for the rotation about the Y-axis which is to be detected under normal condition, is exerted on the transducer 20, as shown in FIGS. 5A, B and C, the pair of oscillating reeds 1a, 1b are deformed into the ")" shape along the Z-axis direction in the positive-phase relation with respect to each other. By the deformation of the pair of oscillating reeds 1a, 1b, deformation in negative-phase relation with respect to each other, that is, deformation such that the signal generated by the detecting unit 6 and the signal generated by the detecting unit 7 have opposite polarity from each other occurs at the portion near one end 2a of the beam 2 and the other end 2b of the beam 2. The detecting units 6, 7 output signals having the relation as describe above, and the influence of the acceleration Fa exerted in the Z-axis direction is removed by calculating and processing these two signals by the calculating circuit.

As described above, according to the transducer 20 of the second exemplary embodiment, in addition to detection of the rotation of the transducer 20 about the Y-axis as in the case of the transducer 10 of the first exemplary embodiment, the detecting units 6 and 7, provided at points other than the portion between the pair of oscillating reeds 1a and 1b of the beam 2, cooperate to detect deformation in the negative-phase relation generated at the portions of the beam 2 where the detecting units 6, 7 are provided, which is caused by the acceleration Fa in the Z-axis direction. Therefore, the acceleration Fa in the Z-axis direction, which is a disturbance for the rotation about the Y-axis can be eliminated, whereby the rotation of the transducer 20 about the Y-axis can be detected with higher degree of accuracy.

Third Exemplary Embodiment

Figure 6A:
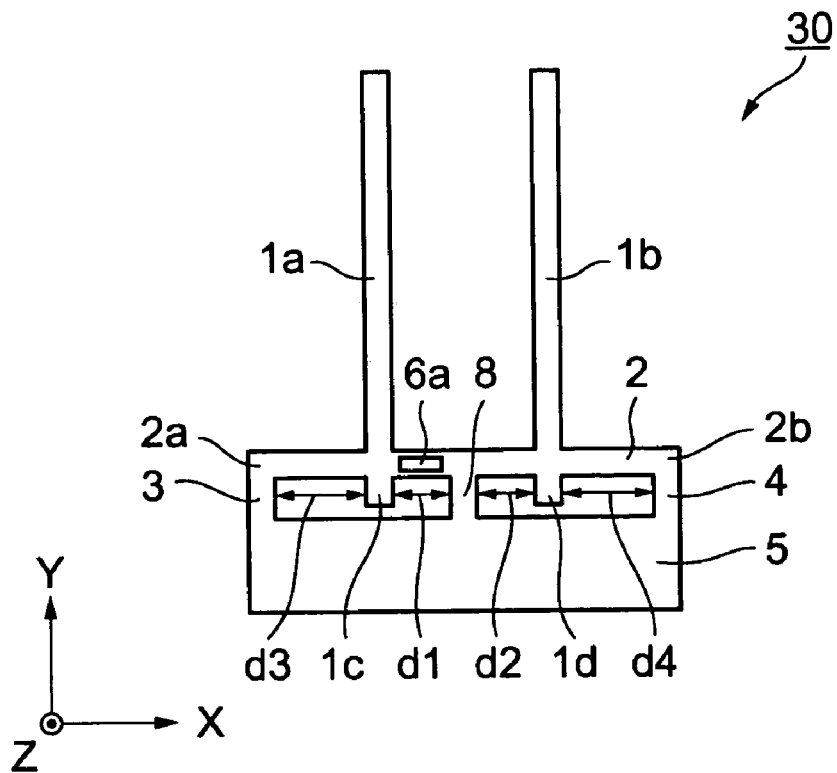
FIGS. 6A and 6B show the structure of a transducer according to a third exemplary embodiment.
Figure 6B:
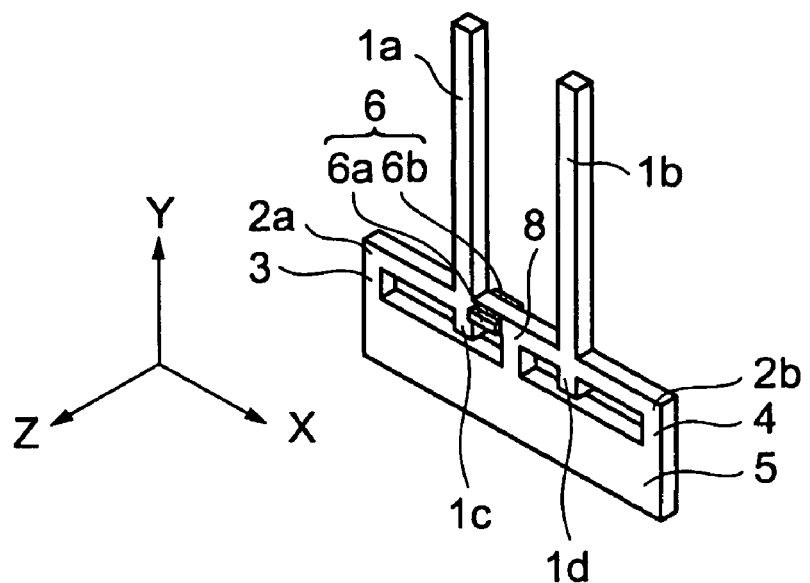

FIG. 6A and FIG. 6B are schematics showing the structure of a transducer according to the third exemplary embodiment, respectively. A transducer 30 in the third embodiment includes the pair of oscillating reeds 1a, 1b, the beam 2, the first connecting device 3, the second connecting device 4, the base member 5, and the detecting unit 6 as in the case of the transducer 10 of the first exemplary embodiment. The transducer 30 includes a third connecting device (connecting member) 8, which is different from the transducer 10.

The third connecting device 8 is a rod-shaped member formed of crystal extending in the Y-axis direction and having a predetermined length to connect the substantially center portion of the beam and the base member 5. Here, the distance d1 between one oscillating reed 1a and the third connecting device 8 and the distance d2 between the other oscillating reed 1b and the third connecting device 8 are set to values shorter than the distance d3 between one oscillating reed 1a and one end 2a of the beam 2 and the distance d4 between the other oscillating reed 1b and the other end 2b of the beam 2. The detecting unit 6 is provided between one oscillating reed 1a of the beam 2 and the third connecting device 8.

In the transducer 30 according to the third exemplary embodiment, the detecting unit 6 detects deformation of the beam 2 at the portion of the beam 2 where the detecting unit 6 is provided, which occurs corresponding to the rotation of the transducer 30 about the Y-axis as in the case of the transducer 10 in the first exemplary embodiment by generating the driving oscillation and the detecting oscillation by the pair of oscillating reeds 1a, 1b as shown in FIG. 2 and FIG. 3, whereby the rotation can be detected. In addition to the detection of the rotation, since the distance d1, d2 is determined to be shorter than the distance d3, d4, that is, since the oscillating reeds 1a, 1b are provided at positions closer to the third connecting device 8 than to the first connecting device 3 and the second connecting device 4, deformation of the beam 2 caused by the detecting oscillation due to the pair of oscillating reeds 1a, 1b is apt to concentrate at the third connecting device 8 or the portion in the vicinity thereof, whereby the rotation can be detected with higher degree of accuracy.

In the transducer 30 according to the third exemplary embodiment, since the third connecting device 8 to connect the beam 2 and the base member 5 is provided, flexibility in wiring between the beam 2 and the base member 5 can be enhanced further in comparison with the transducer 10 in the first exemplary embodiment, which does not include the third connecting device 8.

Figure 7A:
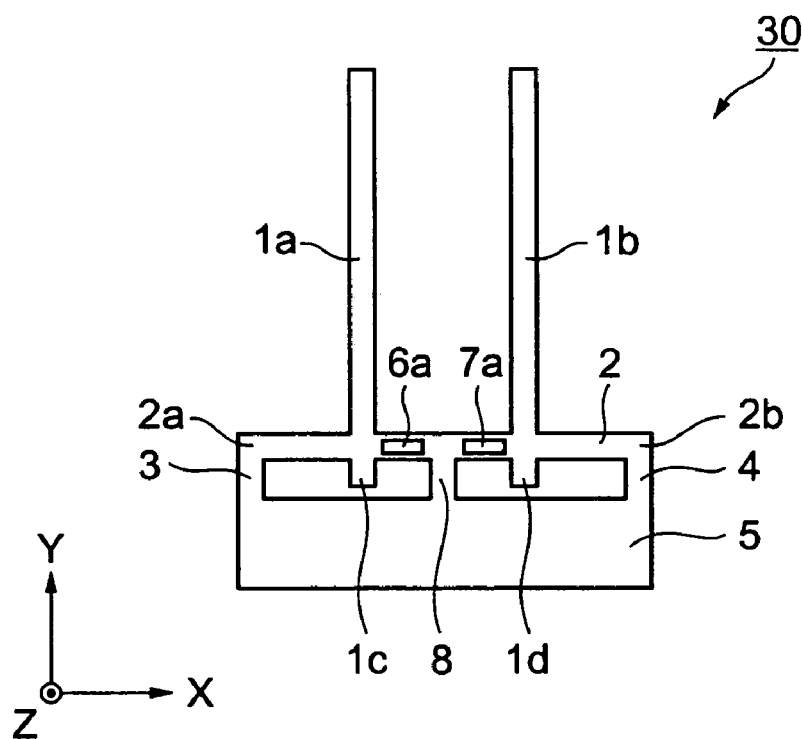
FIGS. 7A and 7B show another position of a detecting unit according to the third exemplary embodiment.
Figure 7B:
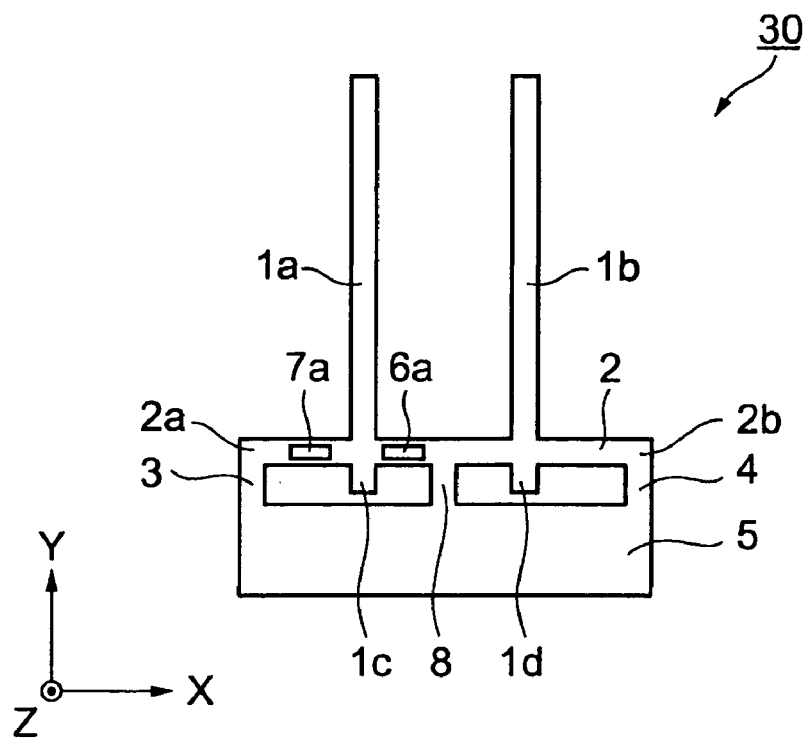

In the transducer 30 according to the third exemplary embodiment, in addition to the provision of the detecting unit 6 between one oscillating reed 1a of the beam 2 and the third connecting device 8, a detecting unit 7 (detecting electrode 7a or the like) may be provided between the other oscillating reed 1b of the beam 2 and the third connecting device 8 as shown in FIG. 7A, or to provide the detecting unit 7 (detecting electrode 7a or the like) between one oscillating reed 1a of the beam 2 and one end 2a of the beam 2 as shown in FIG. 7B. Since deformation in the negative-phase relation with respect to deformation of the beam 2 occurs in the portion of the beam 2 where the detecting unit 6 is provided, the detecting units 6, 7 can cooperate with each other to perform detection to eliminate the acceleration Fa provided in the Z-axis direction as in the case of the detecting units 6 ad 7 in the transducer 20 according to the second exemplary embodiment.

Fourth Exemplary Embodiment

Figure 8A:
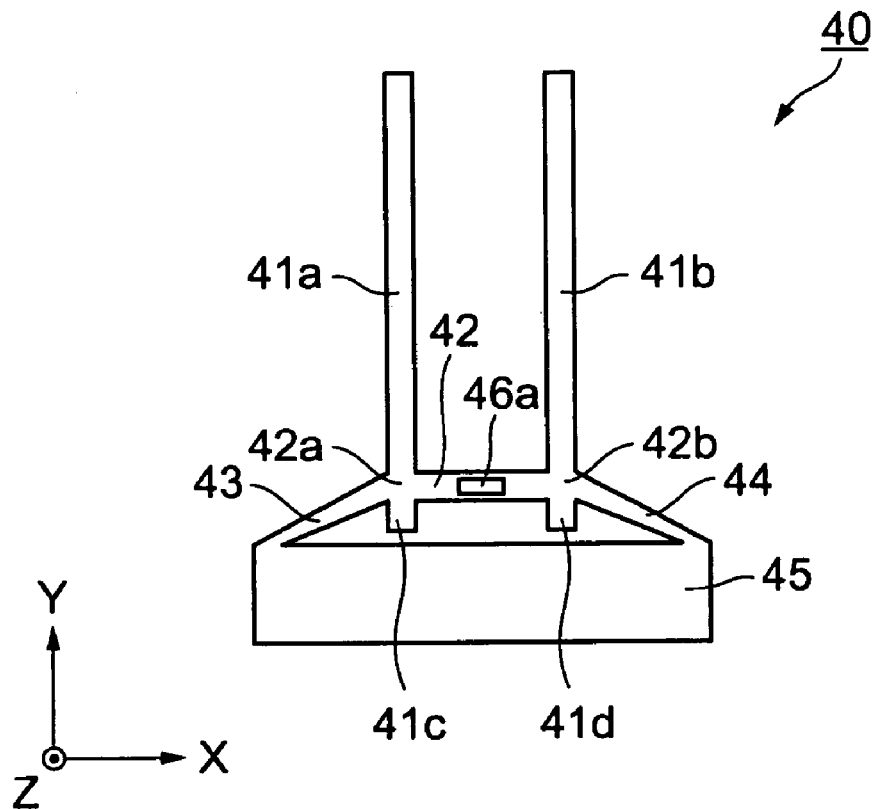
FIGS. 8A and 8B show the structure of a transducer according to a fourth exemplary embodiment.
Figure 8B:
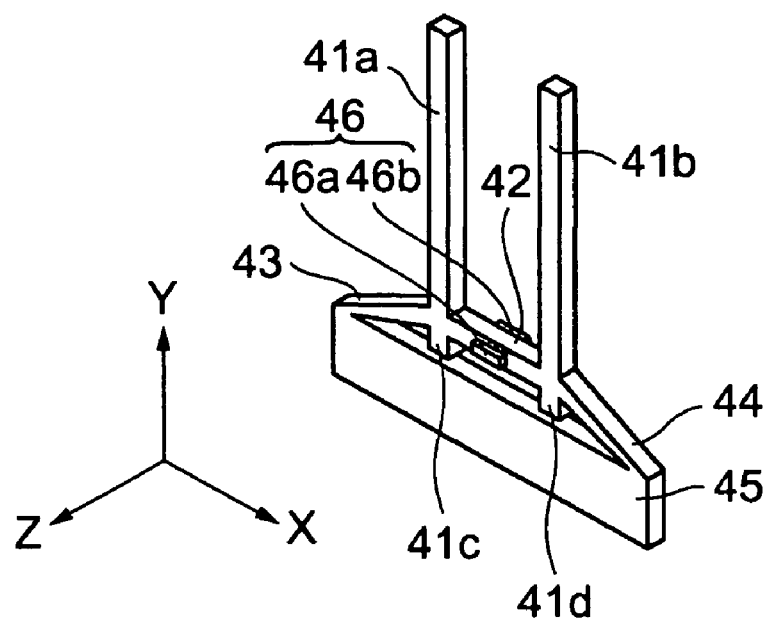

FIG. 8A and FIG. 8B are schematics showing the structure of a transducer according to a fourth exemplary embodiment. A transducer 40 in the fourth exemplary embodiment includes a pair of oscillating reeds 41a, 41b, a beam 42, a first connecting device 43, a second connecting device 44, a base member 45, and a detecting unit 46, corresponding to the pair of oscillating reeds 1a, 1b, the beam 2, the first connecting device 3, the second connecting device 4, and the base member 5 in the transducer 10 according to the first exemplary embodiment.

The pair of oscillating reeds 41a, 41b are retained by the beam 42 by being connected at one end 42a of the beam 42 to one oscillating reed 41a and at the other end 42b of the beam 42 to the other oscillating reed 42b.

The first connecting device 43 connects an intersecting point between one end 42a of the beam 42 and the oscillating reed 41a with the base member 45, and the second connecting device 44 connects the intersecting point between the other end 42b of the beam 42 and the oscillating reed 41b with the base member 45. The detecting unit 46 is provided substantially at the center portion of the beam 42.

In the transducer 40 of the fourth exemplary embodiment, the detecting unit 46 can detect the rotation of the transducer 40 about the Y-axis with a high degree of accuracy by the driving oscillation shown in FIG. 2 and the detecting oscillation shown in FIG. 3 generated by the pair of oscillating reeds 41a, 41b. In addition, in comparison with the transducer 10 of the first exemplary embodiment, the driving oscillation and the oscillation of detection of the pair of oscillating reeds 41a, 41b can hardly be run off to the first connecting device 43 and the second connecting device 44. Specifically, since the oscillation is apt to concentrate at the beam 42 on which the detecting unit 46 is provided, the rotation of the transducer 40 about the Y-axis can be detected with higher degree of accuracy than the rotation of the transducer 10 in the first exemplary embodiment.

Figure 9:
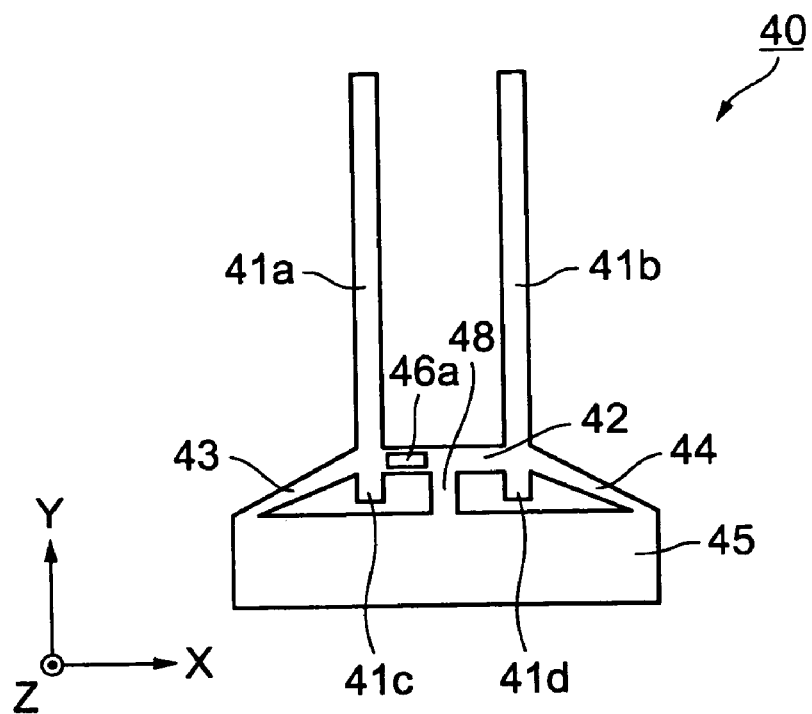
FIG. 9 shows another position of a detecting unit according to the fourth exemplary embodiment.

Instead of providing the detecting unit 46 substantially at the center of the beam 42, as shown in FIG. 9, the substantially center portion of the beam 42 and the base member 45 can be connected by the third connecting device 48 which is similar to the third connecting device 8 described in conjunction with the third exemplary embodiment, and by providing the detecting unit 46 between one oscillating reed 41a and the third connecting device 48, the similar effects to those described above can be obtained.

Figure 10:
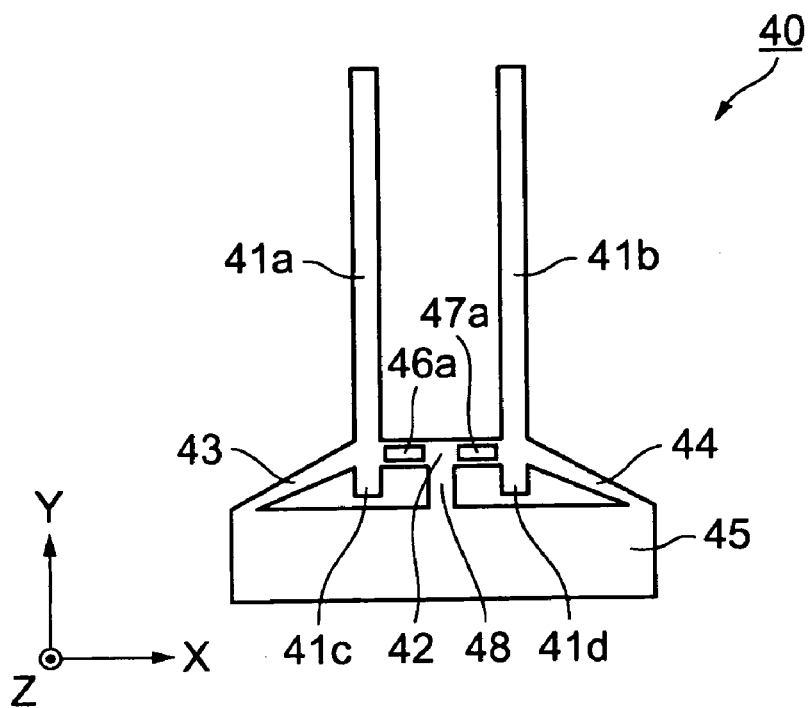
FIG. 10 shows still another position of the detecting unit according to the fourth exemplary embodiment.

In addition to provision of the detecting unit 46 at the portion of the beam 42 shown in FIG. 9, by providing the detecting unit 47 similar to the detecting unit 7 described in the second exemplary embodiment between the other oscillating reed 41b of the beam 2 and the third connecting device 48, as shown in FIG. 10, the detecting units 46, 47 can cooperate with each other, as in the case of the detecting units 6, 7 in the third exemplary embodiment shown in FIG. 7, to perform detection to eliminate the acceleration in the Z-axis direction.

Modifications

Figure 11:
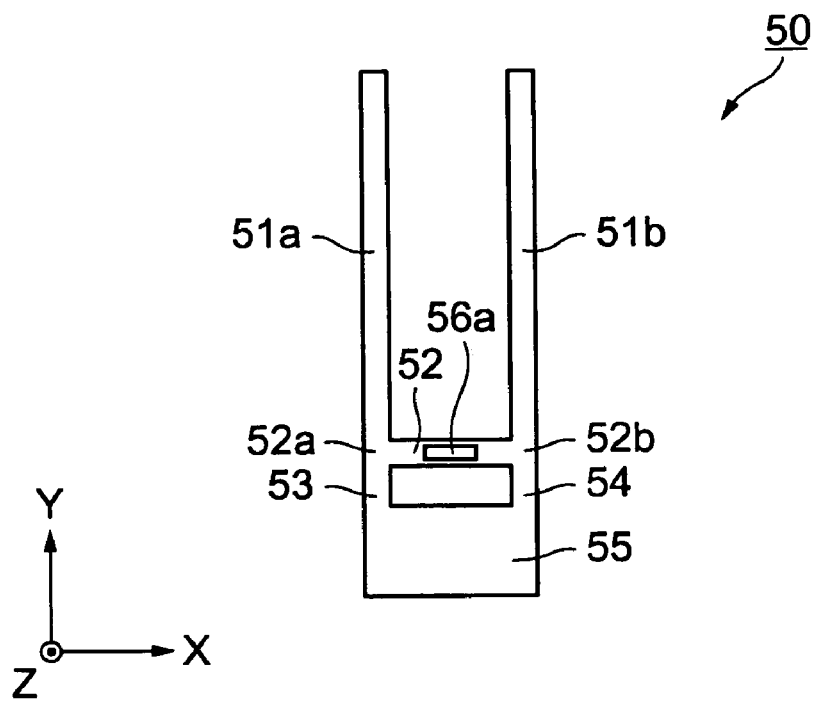
FIG. 11 shows the structure of a transducer according to a modification.

FIG. 11 is a schematic showing the structure of a transducer according to a modification. A transducer 50 in the modification includes a pair of oscillating reeds 51a, 51b, a beam 52, a first connecting device 53, a second connecting device 54, a base member 55, and a detecting unit 56 (detecting electrode 56a or the like) corresponding to the pair of oscillating reeds 1a, 1b, the beam 2, the first connecting device 3, the second connecting device 4, the base member 5, and the detecting unit 6 in the first exemplary embodiment.

The beam 52 is connected at one end 52a to one oscillating reed 51a thereby forming an intersecting point, and in the same manner, is connected at the other end 52b to the other oscillating reed 51b, thereby forming an intersecting point. The first connecting device 53 connects the former intersecting point to the base member 55, and the second connecting device 54 connects the latter intersecting point to the base member 55. Furthermore, the detecting unit 56 is provided substantially at the center portion of the beam 52.

In the transducer 50, the detecting unit 56 can detect the rotation of the transducer 50 about the Y-axis by the driving oscillation shown in FIG. 2 and the detecting oscillation shown in FIG. 3 generated by the pair of oscillating reed 51a, 51b, as in the case of the detecting unit 6 in the transducer 10 according to the first exemplary embodiment.

Figure 12:
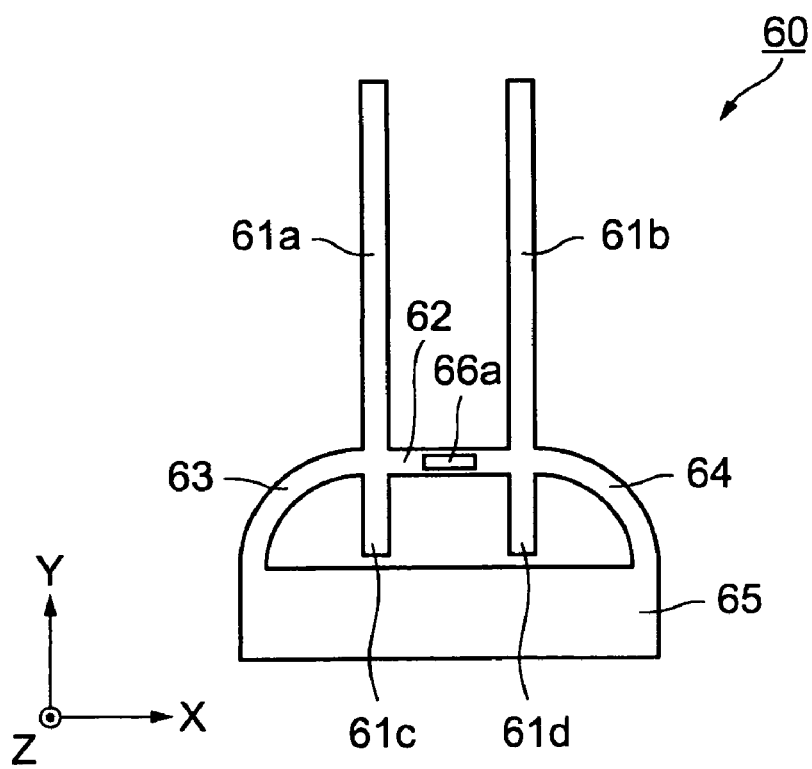
FIG. 12 shows the structure of a transducer according to another modification.

FIG. 12 is a schematic showing the structure of a transducer according to another modification. A transducer 60 of another modification includes a pair of oscillating reeds 61a, 61b, a beam 62, a first connecting device 63, a second connecting device 64, a base member 65, and a detecting unit 66 (detecting electrode 66a or the like) corresponding to the pair of 41a, 41b, the beam 42, the first connecting device 43, the second connecting device 44, the base member 45 and the detecting unit 46 in the transducer 40 according to the fourth exemplary embodiment.

The first connecting device 63 and the second connecting device 64 extend in a curved shape as in an arc of a circle or of an oval, which is different from the case of the first connecting device 43 and the second connecting device 44, which extend linearly, of the transducer 40 according to the fourth exemplary embodiment 4.

In the transducer 60, the detecting unit 66 can detect the rotation of the transducer 60 about the Y-axis by the driving oscillation shown in FIG. 2 and the detecting oscillation shown in FIG. 3 generated by the pair of oscillating reeds 61a, 61 as in the case of the detecting unit 46 of the transducer 40 in the fourth exemplary embodiment.

Figure 13A:
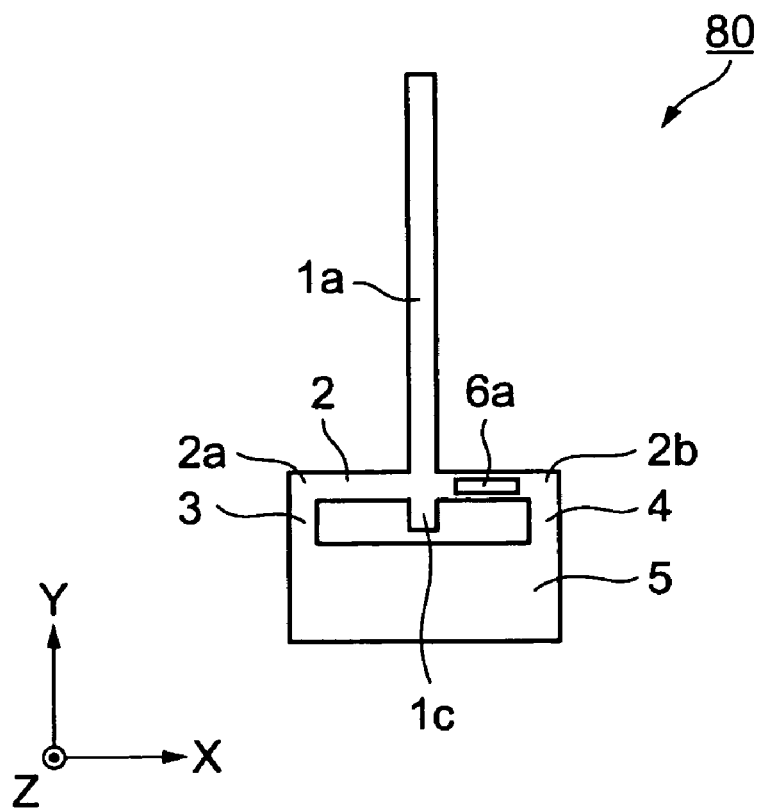
FIGS. 13A and 13B show the structure of a transducer according to still another modification.
Figure 13B:
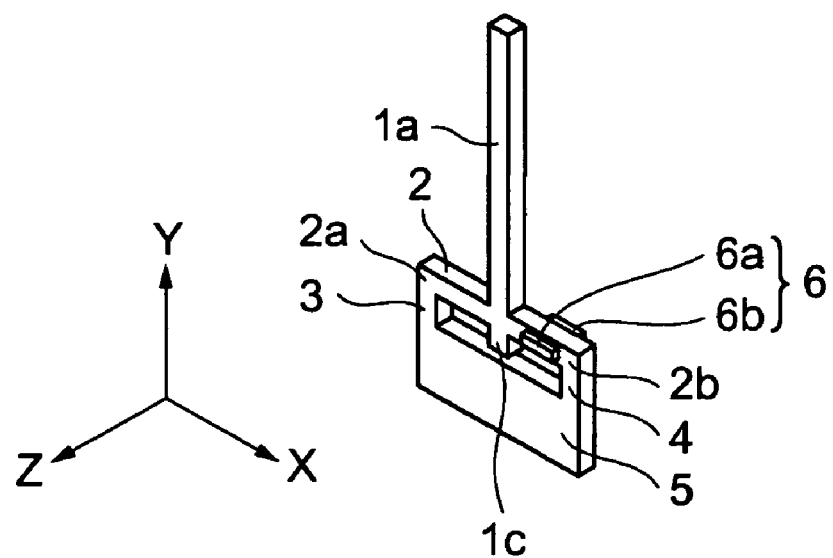

FIG. 13 is a schematic of a transducer according to still another modification. FIG. 13A and FIG. 13B are schematics showing the structure of the transducer.

A transducer 80 of the modification is a transducer having one of the pair of oscillating reeds in the transducer 10 in the first exemplary embodiment.

The transducer 80 includes the oscillating reed 1a, the beam 2, the first connecting device 3, the second connecting device 4, the base member 5, and the detecting units 6 (6a, 6b). The beam 2 is connected at one end 2a and the other end 2b to the oscillating reed 1a, thereby forming an intersecting point. The first connecting device 3 and the second connecting device 4 connect the respective ends 2a and 2b to the base member 5. Furthermore, the detecting unit 6 is provided between the other end 2b of the beam 2 and the oscillating reed 1a.

In the transducer 80, oscillations to drive and detect oscillation of the oscillating reed 1a are the same oscillations as in the oscillating reed 1a of the transducer 10 described in the first exemplary embodiment (See FIG. 2 and FIG. 3). In this manner, the detecting unit 6 of the transducer 80 can detect the rotation of the transducer 80 about the Y-axis by the driving oscillation and the oscillation of detection for the oscillating reed 1a.

Figure 14:
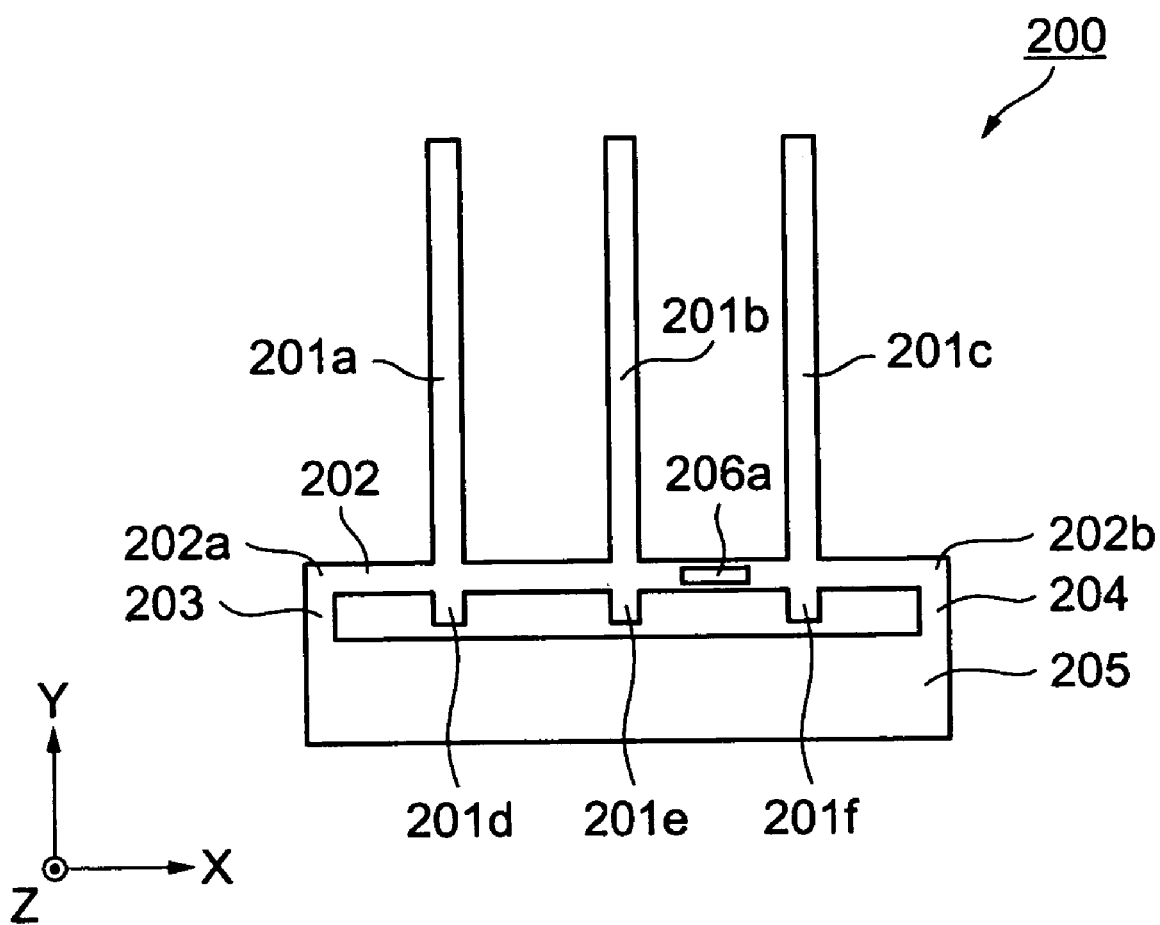
FIG. 14 shows the structure of a transducer according to further modification.

FIG. 14 is a schematic showing the structure of a transducer according to further modification.

A transducer of the modification is a transducer 200 provided with three oscillating reeds.

The transducer 200 includes oscillating reeds 201a, 201b, 201c, a beam 202, a first connecting device 203, a second connecting device 204, a base member 205, and a detecting unit 206 (206a and 206b (not shown) provided so as to oppose to 206a).

The beam 202 connects the oscillating reeds 201a, 201b, 201c and is connected at one end 202a to the oscillating reed 201a, to form an intersecting point, and in the same manner, is connected at the other end 202b to the oscillating reed 201c, to form an intersecting point. The first connecting device 203 connects the one end 202a to the base member 205, and the second connecting device 204 connects the other end 202b to the base member 205. Also, the lower end 201d of the oscillating reed 201a, the lower end 201e of the oscillating reed 201b, and the lower end 201f of the oscillating reed 201c project downwardly of the beam 202. Furthermore, the detecting unit 206 is provided between the oscillating reeds 201b and 201c of the beam 202.

The oscillations in driving mode of the oscillating reeds 201a, 201b, 201c generate bending oscillation along the X-axis direction so that the respective adjacent oscillating reeds oscillate in the negative-phase relation. As regards the X-axis direction, the oscillating reed 201b is deformed into the ")" shape and the oscillating reed 201c is deformed into the "(" shape when the oscillating reed 201a is deformed into the "(" shape. Specifically, the oscillating reeds 201a, 201b, 201c oscillate in such a manner that the distal ends of the adjacent oscillating reeds move toward and away from each other.

Regarding the driving oscillation, it is also possible to immobilize the oscillating reed 201b at the center and drive the oscillating reed 201a and the oscillating reed 201c in the negative-phase respectively.

The detecting oscillation in a detecting mode for the oscillating reeds 201a, 201b, 201c generates bending oscillation in the negative-phase relation with respect to each other along the Z-axis direction perpendicular to the virtual plane (XY-plane). Specifically, the oscillating reed 201b is deformed into the ")" shape and the oscillating reed 201c is deformed into the "(" shape when the oscillating reed 201a is deformed into the "(" shape with respect to the Z-axis direction.

In a case where the center oscillating reed 201b is immobilized and the oscillating reed 201a and the oscillating reed 201c are driven in the negative-phase with respect to each other for the driving oscillation, the detecting oscillation is excited by the oscillating reeds 201a and 201c. Specifically, the oscillating reed 201b was immobilized, and the oscillating reed 201c is deformed into the ")" shape when the oscillating reed 201a is deformed into the "(" shape with respect to the Z-axis direction.

In this manner, the detecting unit 206 of the transducer 200 can detect the rotation of the transducer 200 about the Y-axis by the driving oscillation and the detecting oscillation of the oscillating reeds.

Although the cases in which one to three oscillating reeds are provided have been described in the above-described exemplary embodiments, four or more oscillating reeds may also be applicable, and the same effects may be achieved.

Applied Equipment

Subsequently, an exemplary embodiment of electronic equipment according to the present invention will be described.

Figure 16:
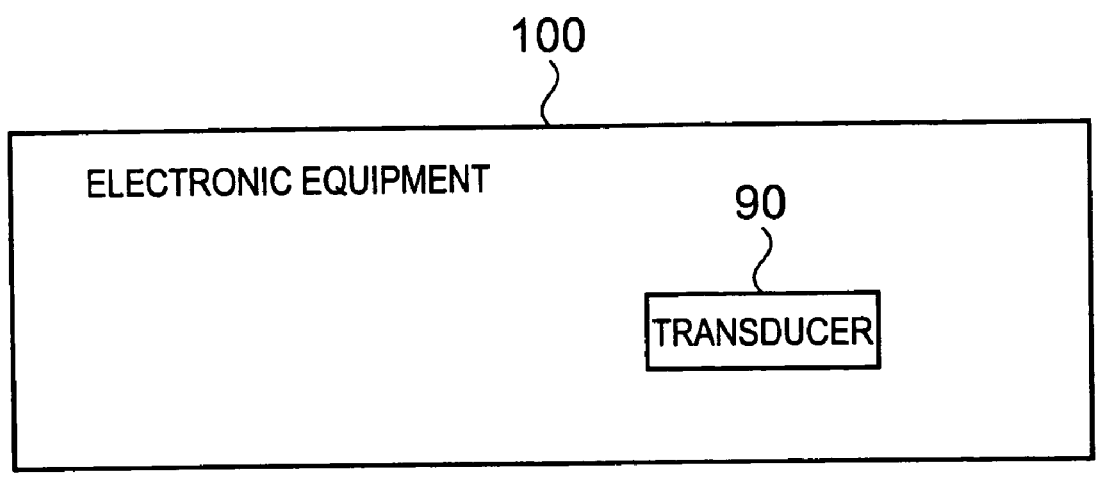
FIG. 16 shows the structure of applied equipment according to the exemplary embodiment.

FIG. 16 is a schematic showing the structure of electronic equipment. Electronic equipment 100 is provided with a transducer 90 which is any of the transducers described in the aforementioned exemplary embodiments.

As an example of applied equipment employing the transducer according to the aforementioned exemplary embodiment, there is electronic equipment, such as mobile phones, digital cameras, video cameras, and navigation system, in which detection of the posture is required. In the electronic equipment described above, the aforementioned effects are achieved by the transducer which detects changes in posture of the electronic equipment as the change in posture of the transducer.

Fifth Exemplary Embodiment

An exemplary embodiment of a method of adjusting the frequency of a transducer will be described below. Prior to its description, necessity of adjustment of the frequency of a transducer, such as a gyroscopic transducer will be described.

The gyroscopic transducer as described above is configured in such a manner that two types of oscillations are excited for one oscillating reed. One is driving oscillation to drive the oscillating reed, and the other one is detecting oscillation caused by a Coriolis force corresponding to the rotation of the oscillating reed. These vibrations differ in the direction of oscillation.

Theoretically, when the frequencies of the driving frequency and of the detecting frequency are equalized, the sensitivity to detect the angular speed of the rotation is enhanced to the maximum level. However, although the sensitivity to detect the angular speed is enhanced, since the amplitude of oscillation increases, it takes time until the oscillation becomes the maximum amplitude and is stabilized. Thus, the detection responsibility for the angular speed deteriorates. In contrast, when the difference in frequencies of the driving oscillation and of the detection oscillation increases, the detection responsibility is enhanced, but the sensitivity to detect the angular speed deteriorates since the S/N ratio for the case of converting the vibrations of the oscillating reed into the electric signals is lowered.

Therefore, in order to achieve a good property as a transducer, it is necessary to set the difference of frequency within a predetermined range.

Normally, the frequency for driving oscillation (resonance frequency of driving oscillation) of the oscillating reed tends to vary due to the production difficulties. Therefore, it is necessary to adjust the frequency to a target value. Also, there is a large difference between the frequency of driving oscillation (resonance frequency of driving oscillation) and the frequency of detecting frequency (resonance frequency of detecting oscillation), and this difference is also required to be adjusted.

Figure 17:
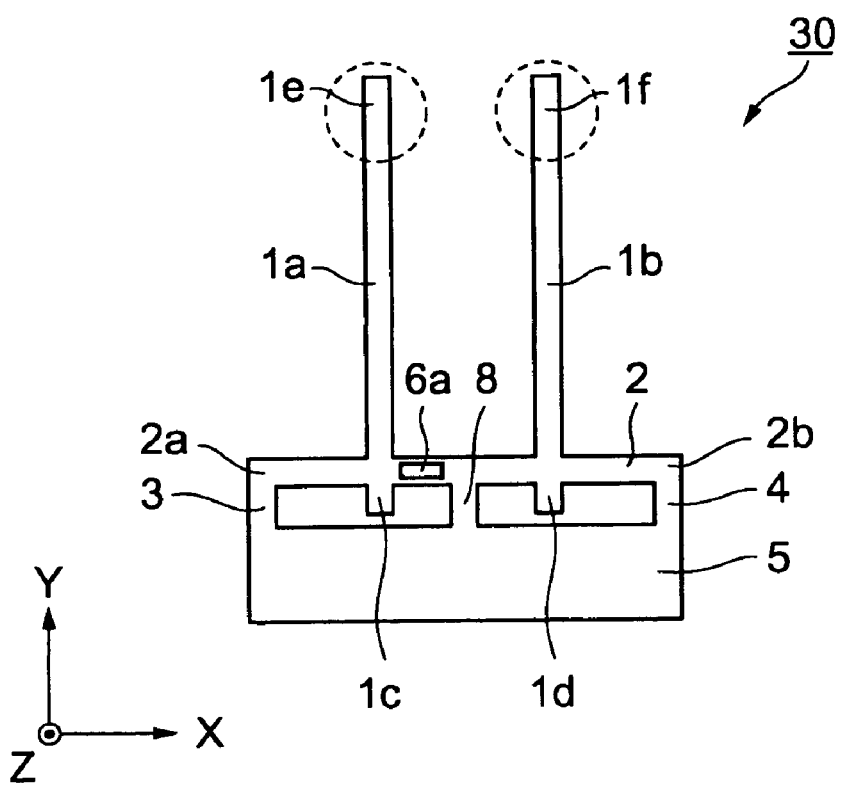
FIG. 17 shows a method of adjusting the frequency of a transducer according to a fifth exemplary embodiment.
Figure 18A:
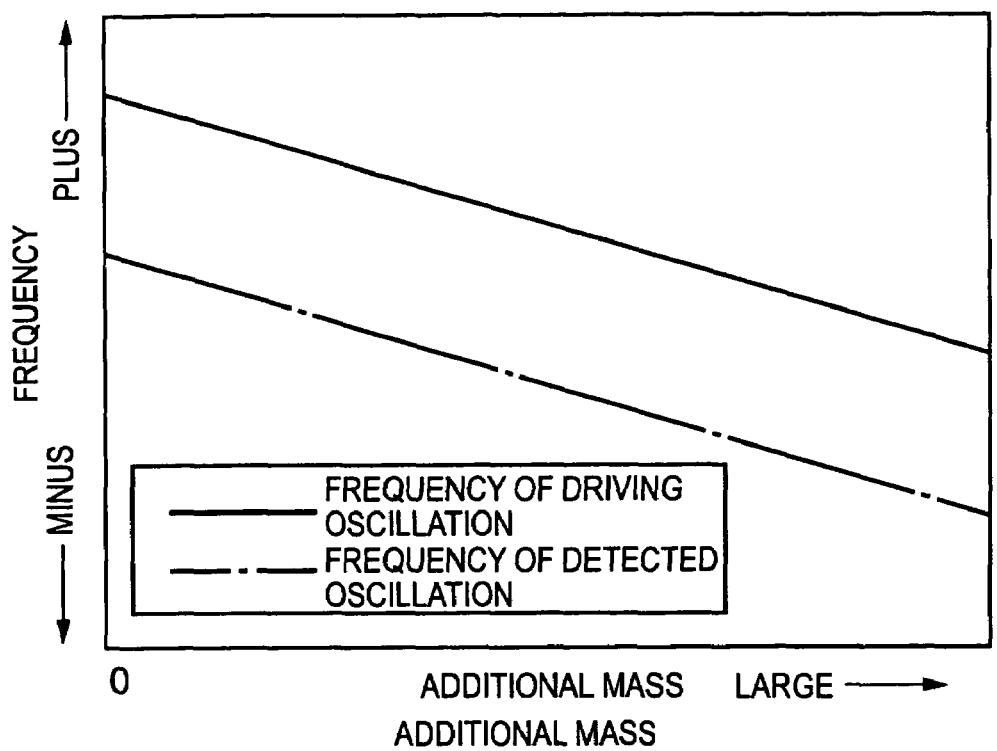
FIGS. 18A and 18B show variations in frequency in the method of adjusting the frequency of the transducer according to the fifth exemplary embodiment.
Figure 18B:
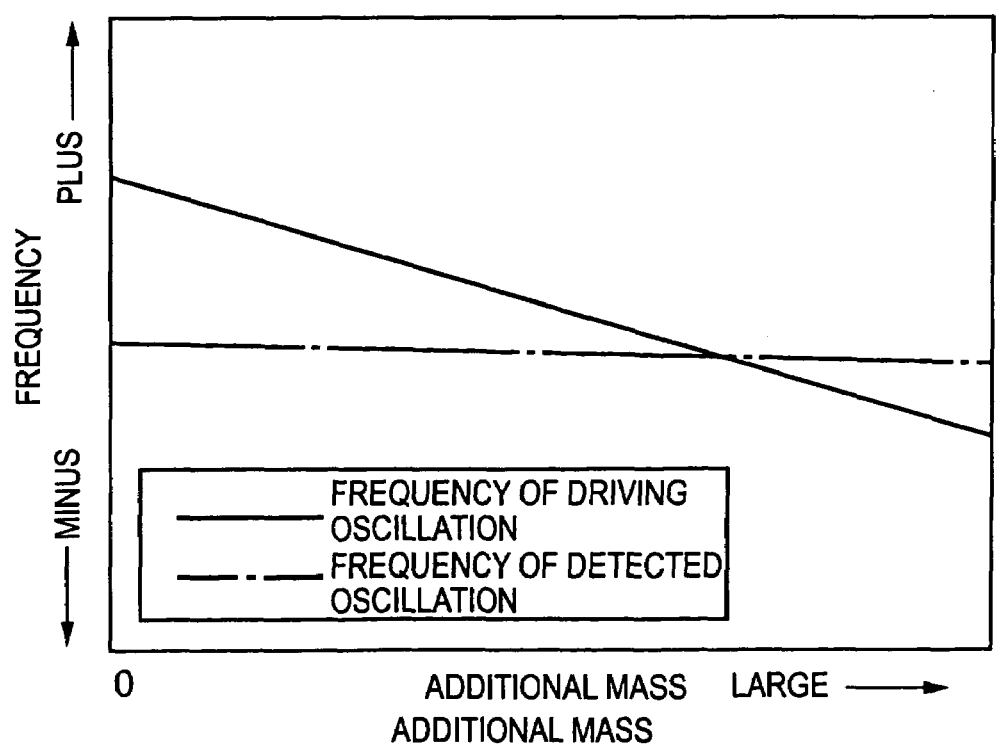

FIG. 17 is a schematic for explaining adjustment of the frequency of the transducer. FIGS. 18A and 18B are schematics explaining the state of variations in the frequency of driving oscillation and the frequency of detecting oscillation in the frequency adjusting operation.

FIG. 18A is a schematic showing variations in frequency when the frequency of driving oscillation is adjusted, and FIG. 18B is a schematic showing variations in frequency when the frequency of detecting oscillation is adjusted.

Here, the transducer 30 described in the third exemplary embodiment will be explained as an example. The structure of the transducer 30 will be omitted since it has already been described above.

When adjusting the frequencies of driving oscillation of the oscillating reeds 1a, 1b as the first extending portions extending longitudinally from the beam 2, a mass is added to the upper end 1e of the oscillating reed 1a or to the upper end 1f of the oscillating reed 1b to adjust the frequency in descending direction. Specifically, metal, such as Au or Ag is deposited to the upper ends 1e and 1f of the oscillating reeds to add a mass thereto. By controlling the mass in this manner, adjustment of the frequency of driving oscillation to a predetermined frequency is achieved.

At this time, as shown in FIG. 18A, as the frequency of driving oscillation varies by addition of the mass, the frequency of detecting oscillation varies correspondingly, and hence there is little change in difference between the frequency of driving oscillation and the frequency of detecting oscillation. In this manner, when the mass of the upper end 1e of the oscillating reed 1a or of the upper end 1f of the oscillating reed 1b is changed, the frequency of driving oscillation and the frequency of detecting oscillation affect each other, whereby the frequency varies.

Subsequently, a mass is added to the lower end 1c of the oscillating reed 1a or to the lower end 1d of the oscillating reed 1b as the second extending portion extending shortly from the beam 2 to adjust the frequency of detecting oscillation in descending direction. Specifically, metal, such as Au or Ag is deposited to the lower ends 1c, 1d of the oscillating reeds to add the mass.

At this time, variations in frequency are such that the frequency of detecting oscillation is lowered with addition of the mass as shown in FIG. 18B. In contrast, the frequency of driving oscillation is slightly lowered. Accordingly, the difference between the frequency of driving oscillation and the frequency of detecting oscillation can be adjusted to the predetermined range. In this manner, when the mass at the lower end 1c of the oscillating reed 1a or of the lower end 1d of the oscillating reed 1b is changed, mainly the frequency of detection oscillation is affected, and the frequency in driving oscillation is little affected. In the case of the detecting oscillation, since the lower ends 1c, 1d of the oscillating reeds oscillate upon reception of inertia of the oscillating reeds 1a, 1b, oscillations after the mass is added to the lower ends 1c, 1d of the oscillating reeds affect the detecting oscillation of the oscillating reeds 1a, 1b.

Also, in the above-described adjustment of the frequency, when the frequency of driving oscillation is deviated from the predetermined frequency after having adjusted the difference between the frequency in driving oscillation and the frequency of detecting oscillation, the frequency can be adjusted to the predetermined value by increasing the frequency by removing part of metal by irradiating a laser beam to the metal added as a mass to the upper ends 1e, 1f of the oscillating reeds.

When the frequency of driving oscillation is within the predetermined range before adjusting the frequency, what has to be done is only adjustment of the frequency of detecting oscillation, specifically, adjustment of the mass of the lower ends 1c, 1d of the oscillating reeds. When the difference between the frequency of driving oscillation and the frequency of detecting frequency is within the predetermined range, what has to be done is adjustment of the frequency of driving oscillation, specifically, adjustment of the mass of the upper ends 1e, 1f of the oscillating reeds.

Subsequently, the structure of a modification of the transducer that can further facilitate adjustment of the frequency will be described.

Figure 19:
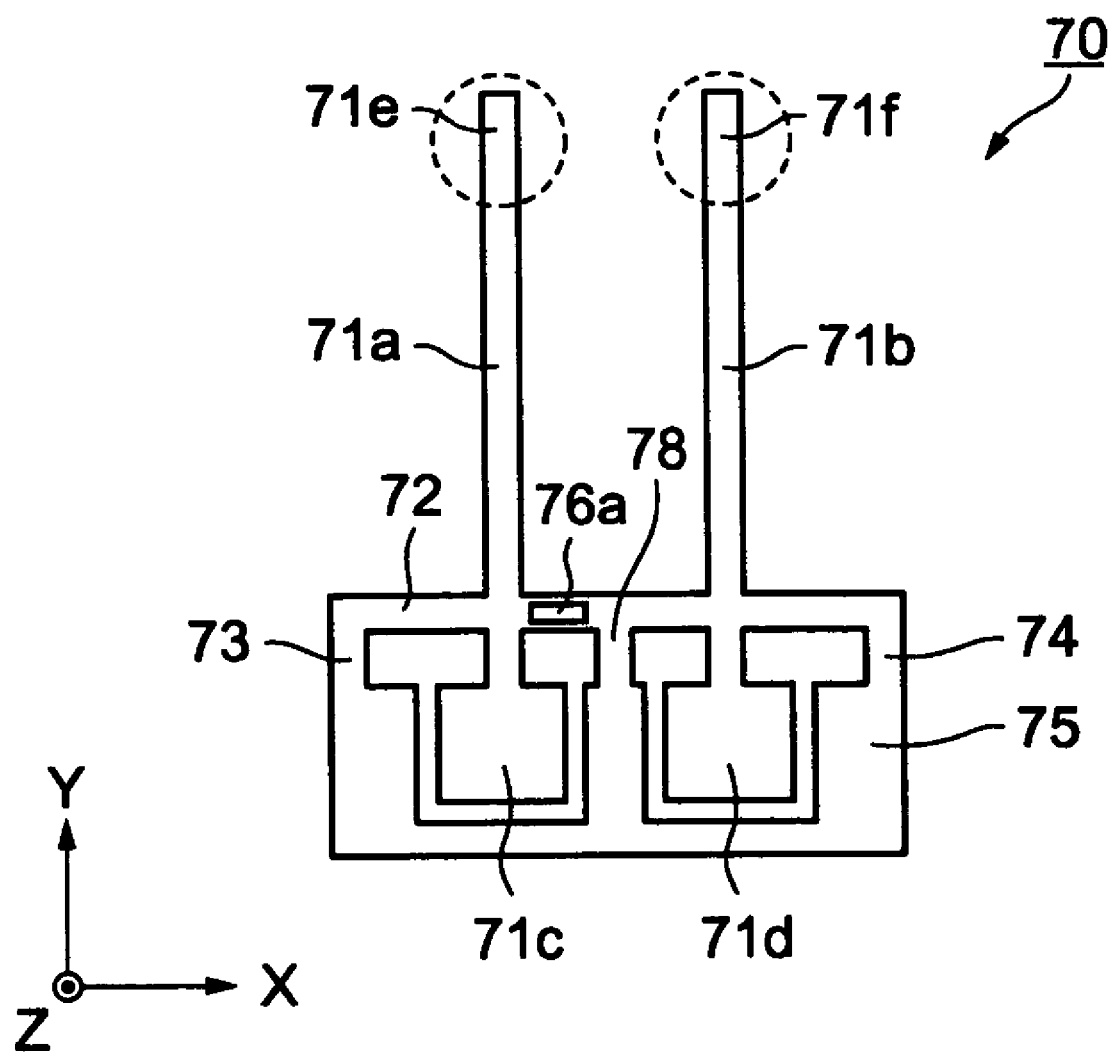
FIG. 19 shows the structure of the transducer according to a modification.

FIG. 19 is a schematic of a transducer according to a modification.

A transducer 70 according to the modification includes, as in the case of the transducer 30 of the third exemplary embodiment, a beam 72, a pair of oscillating reeds 71a, 71b as a first extending portion extending longitudinally from the beam 72, a first connecting device 73, a second connecting device 74, a third connecting device 78, a base member 75, and a detecting unit 76a. The transducer 70 is different from the transducer 30 in that the lower ends of the oscillating reeds 71a, 71b are formed with frequency adjusting devices 71c, 71d as the second extending portion extending shortly from the beam 72. The distal ends of the frequency adjusting devices 71c, 71d have larger area then the proximal portions thereof.

Adjustment of the frequencies of the oscillating reeds 71a, 71b is performed by adding a mass to the upper end 71e of the oscillating reed 71a or to the upper end 71f of the oscillating reed 71b to adjust the frequency of driving oscillation. Subsequently, adjustment of the frequency of detecting oscillation is performed by adding the mass to the frequency adjusting device 71c at the lower end of the oscillating reed 71a or the frequency adjusting device 71d at the lower end of the oscillating reed 71b. In the transducer 70, since the mass can be added to the frequency adjusting devices 71c, 71d having a large area, the adjusting width of the frequency can be increased in comparison with the transducer 30.

In this manner, in the present exemplary embodiment, although adjustment of the frequency can be performed mainly by adding the mass, it is also possible to adjust the frequency of driving oscillation or the frequency of detecting oscillation by adding the mass in advance, and then removing part of the mass to adjust the frequency of driving oscillation or the frequency of detecting oscillation.

As described above, according to the present exemplary embodiment, the frequency of driving oscillation and the frequency of detecting frequency can be adjusted easily to the predetermined range, whereby a problem that adjustment of the frequency cannot be performed satisfactorily in the related art, and hence a method of adjusting the frequency which can enhance the process yield can be obtained.

Also, a method of adjusting the frequency of the transducer according to the present exemplary embodiment can be utilized not only for the gyroscopic transducer, but also for adjustment of the frequency of the resonator.

What is claimed is:

1. A transducer, comprising:
    a rod-shaped oscillating reed extending along a first direction, which corresponds to a center axis of rotation of the transducer, to generate a first oscillation to generate a Coriolis force corresponding to the rotation, the oscillating reed including a pair of rod-shaped oscillating reeds extending along the first direction, in parallel to each other;
    a beam extending in a second direction in parallel with a virtual plane including the oscillating reed and perpendicular to the first direction and being connected to the oscillating reed;
    a first detecting unit provided on the beam to detect deformation of the beam due to a second oscillation of the oscillating reed caused by the Coriolis force, the first detecting unit being provided between the pair of oscillating reeds;
    a second detecting unit provided on the beam to detect the deformation of the beam, the first detecting unit and the second detecting unit cooperating to perform detection to eliminate a disturbance for the rotation of the transducer in a third direction perpendicular to the virtual plane;
    a base member to support the beam;
    a first connecting device to connect one end of the beam and the base member;
    a second connecting device to connect the other end of the beam and the base member; and
    a third connecting device to connect a substantially center portion of the beam and the base member,
    said first connecting device, said second connecting device, said base member, and said beam defining a closed space.

2. The transducer according to claim 1, the first detecting unit being provided between one of the pair of oscillating reeds and the third connecting device, and the second detecting unit being provided between the other one of the pair of oscillating reeds and the third connecting device.

3. The transducer according to claim 1, the first detecting unit being provided between one of the pair of oscillating reeds and the third connecting device, and the second detecting unit being provided between one oscillating reed and either the one end or the other end of the beam, which is closer to the one oscillating reed.

4. The transducer according to claim 1, the distance between one of the pair of oscillating reeds and the third connecting device being shorter than the distance between the one oscillating reed and one of the first connecting device and the second connecting device, which is closer to the one oscillating reed.

5. Electronic equipment, inside which is included the transducer according to claim 1.

6. A transducer, comprising:
    a rod-shaped oscillating reed extending along a first direction, which corresponds to a center axis of rotation of the transducer, to generate a first oscillation to generate a Coriolis force corresponding to the rotation, the oscillating reed including a pair of rod-shaped oscillating reeds extending along the first direction, in parallel to each other;
    a beam extending in a second direction in parallel with a virtual plane including the oscillating reed and perpendicular to the first direction and being connected to the oscillating reed;
    a first detecting unit provided on the beam to detect deformation of the beam due to a second oscillation of the oscillating reed caused by the Coriolis force, the first detecting unit being provided between the one end of the beam, which is located at a point other than a portion of the beam disposed between the pair of oscillating reeds, and the one of the pair of oscillating reeds that is closer to the one end of the beam;

a base member to support the beam;

a first connecting device to connect one end of the beam and the base member; and a second connecting device to connect the other end of the beam and the base member, said first connecting device, said second connecting device, said base member, and said beam defining a closed space.

7. The transducer according to claim 6, further comprising:

a second detecting unit provided between the other end of the beam and the other one of the pair of oscillating reeds located at the point other than the portion of the beam disposed between the pair of oscillating reeds to detect deformation of the beam, the first detecting unit and the second detecting unit cooperating to perform detection to eliminate a disturbance for the rotation of the transducer in a third direction perpendicular to the virtual plane.

8. Electronic equipment, inside which is included the transducer according to claim 6.

9. A method of adjusting frequency of a transducer including a rod-shaped oscillating reed extending along a first direction, which corresponds to a center axis of rotation of the transducer, to generate a first oscillation to generate a Coriolis force corresponding to the rotation, the oscillating reed including a pair of rod-shaped oscillating reeds extending along the first direction, in parallel to each other; a beam extending in a second direction in parallel with a virtual plane including the oscillating reed and perpendicular to the first direction and being connected to the oscillating reed; a beam extending in a second direction in parallel with a virtual plane including the oscillating reed and perpendicular to the first direction and being connected to the oscillating reed; a first detecting unit provided on the beam to detect deformation of the beam due to a second oscillation of the oscillating reed caused by the Coriolis force, the first detecting unit being provided between the pair of oscillating reeds; a second detecting unit provided on the beam to detect the deformation of the beam, the first detecting unit and the second detecting unit cooperating to perform detection to eliminate a disturbance for the rotation of the transducer in a third direction perpendicular to the virtual plane; a base member to support the beam; a first connecting device to connect one end of the beam and the base member; a second connecting device to connect the other end of the beam and the base member; and a third connecting device to connect a substantially center portion of the beam and the base member, said first connecting device, said second connecting device, said base member, and said beam defining a closed space, the method comprising:

adjusting a mass on at least one of the ends of the oscillating reed.

10. The method of adjusting frequency of the transducer according to claim 9, further comprising:

adjusting the frequency of the driving oscillation and the frequency of the detected oscillation, adjusting a mass formed at a distal end of a first extending portion extending longitudinally from the beam, and the difference between the frequency of the driving oscillation and the frequency of the detected oscillation being adjusted by adjusting a mass at a distal end of a second extending portion extending from the beam.

11. The method of adjusting frequency of the transducer according to claim 10, further comprising:

providing the distal end of the second extending portion with a frequency adjusting device formed larger than a proximal end of the second extending portion, and the frequency of the transducer being adjusted by adjusting the mass.

* * * * *